US008459176B2

(12) United States Patent
Nevarez et al.

(10) Patent No.: US 8,459,176 B2
(45) Date of Patent: Jun. 11, 2013

(54) INTEGRATED METHOD AND SYSTEM FOR DISPENSING AND BLENDING/MIXING BEVERAGE INGREDIENTS

(75) Inventors: Roberto Nevarez, Hudson, FL (US); William E. Smith, Land O' Lakes, FL (US); Jan Claesson, Land O' Lakes, FL (US)

(73) Assignee: Enodis Corporation, New Port Richey, FL (US)

( * ) Notice: Subject to any disclaimer, the term of this patent is extended or adjusted under 35 U.S.C. 154(b) by 581 days.

(21) Appl. No.: 12/633,790

(22) Filed: Dec. 8, 2009

(65) Prior Publication Data

US 2010/0139493 A1 Jun. 10, 2010

Related U.S. Application Data

(60) Provisional application No. 61/120,772, filed on Dec. 8, 2008.

(51) Int. Cl.
*A23L 2/00* (2006.01)

(52) U.S. Cl.
USPC .......... 99/275; 99/290; 99/300; 241/DIG. 17; 241/101.2

(58) Field of Classification Search
USPC ............. 99/275, 290, 300, 484; 241/DIG. 17, 241/101.2; 366/147, 168.1, 197, 207, 286, 366/289, 316
See application file for complete search history.

(56) References Cited

U.S. PATENT DOCUMENTS

| | | | |
|---|---|---|---|
| 2,008,106 A | 7/1935 | Lawrence | 366/197 |
| 2,653,733 A | 9/1953 | Rudd et al. | |
| 2,855,007 A | 10/1958 | Erickson et al. | 99/275 |
| 3,101,872 A | 8/1963 | Dickinson | |
| 3,154,123 A | 10/1964 | Tomlinson | 241/101.6 |
| 3,156,103 A | 11/1964 | Ross | 62/331 |
| 3,272,388 A | 9/1966 | Whitmore | |
| 3,295,997 A | 1/1967 | Tomlinson et al. | 241/34 |
| 3,460,716 A | 8/1969 | Thomas | |
| 3,460,717 A | 8/1969 | Thomas | |
| 3,505,075 A | 4/1970 | Black | |

(Continued)

FOREIGN PATENT DOCUMENTS

| | | |
|---|---|---|
| EP | 0176259 B1 | 1/1990 |
| EP | 1690481 A2 | 8/2006 |

(Continued)

OTHER PUBLICATIONS

International Preliminary Report on Patentability issued Dec. 15, 2011 in the related PCT/US2010/054317.

(Continued)

*Primary Examiner* — Reginald L Alexander
(74) *Attorney, Agent, or Firm* — Ohlandt, Greeley, Ruggiero & Perle, LLP

(57) ABSTRACT

An integrated beverage blending system comprising: a controller for menu selection; an ice portion control module; an ingredient module; a dispensing apparatus in communication with the ice portion control module and the ingredient module, wherein the ice and the ingredient are dispensed into a beverage container via the dispensing apparatus; and at least one blender module which blends and/or mixes the ice and the ingredient in the beverage container, thereby producing the beverage; wherein, upon removal of the beverage container from the blender module, the blender module initiates a cleaning mode.

22 Claims, 34 Drawing Sheets

U.S. PATENT DOCUMENTS

| | | | |
|---|---|---|---|
| 3,592,367 A | 7/1971 | Landis et al. | |
| 3,615,673 A | 10/1971 | Black et al. | 99/79 |
| 3,630,045 A | 12/1971 | Lunde | 62/320 |
| 3,704,599 A | 12/1972 | Darby et al. | 62/354 |
| 3,987,211 A | 10/1976 | Dunn et al. | 426/551 |
| 4,083,462 A | 4/1978 | Teske et al. | |
| 4,276,750 A | 7/1981 | Kawasumi | 62/137 |
| 4,392,588 A | 7/1983 | Scalera | 222/129.4 |
| 4,528,824 A | 7/1985 | Herbert | |
| 4,531,380 A | 7/1985 | Hagen | 62/320 |
| 4,590,975 A | 5/1986 | Credle, Jr. | |
| 4,610,145 A | 9/1986 | Arzberger et al. | |
| 4,638,875 A | 1/1987 | Murray | |
| 4,653,281 A | 3/1987 | Van Der Veer | 62/71 |
| 4,681,030 A | 7/1987 | Herbert | 99/484 |
| 4,708,487 A | 11/1987 | Marshall | |
| 4,745,773 A | 5/1988 | Ando | 62/320 |
| 4,790,240 A | 12/1988 | Henn et al. | |
| 4,932,223 A | 6/1990 | Paul et al. | 62/354 |
| 4,941,593 A | 7/1990 | Hicks et al. | |
| 4,962,866 A | 10/1990 | Phillips | 221/8 |
| 5,036,892 A | 8/1991 | Stembridge et al. | 62/1 |
| 5,067,819 A | 11/1991 | Heinhold et al. | |
| 5,068,116 A | 11/1991 | Gibney et al. | |
| 5,104,007 A | 4/1992 | Utter | 222/146.6 |
| 5,192,131 A | 3/1993 | Hatfield | 366/308 |
| 5,208,050 A | 5/1993 | Ney | 425/202 |
| 5,280,845 A | 1/1994 | Leight | 221/2 |
| 5,323,691 A | 6/1994 | Reese et al. | 99/275 |
| 5,350,082 A | 9/1994 | Kiriakides et al. | 141/1 |
| 5,439,289 A | 8/1995 | Neilson | 366/307 |
| 5,549,219 A | 8/1996 | Lancaster | 221/1 |
| 5,619,901 A | 4/1997 | Reese et al. | 99/275 |
| 5,683,011 A | 11/1997 | Miliani | |
| 5,690,253 A | 11/1997 | LaFleur | 222/102 |
| 5,698,247 A | 12/1997 | Hall | 426/66 |
| 5,778,761 A | 7/1998 | Miller | 99/275 |
| 5,797,519 A | 8/1998 | Schroeder et al. | 222/129.1 |
| 5,803,377 A | 9/1998 | Farrell | 241/36 |
| 5,833,362 A | 11/1998 | Shepard | 366/111 |
| 5,839,291 A | 11/1998 | Chang | 62/126 |
| 5,863,118 A | 1/1999 | Ackels et al. | 366/129 |
| 5,910,164 A | 6/1999 | Snelling et al. | 62/344 |
| 5,911,749 A | 6/1999 | Sugie | 62/354 |
| 5,934,516 A | 8/1999 | Strycharskie et al. | 222/158 |
| 5,960,701 A | 10/1999 | Reese et al. | 99/275 |
| 5,967,367 A | 10/1999 | Orsborn | 222/30 |
| 6,068,875 A | 5/2000 | Miller et al. | 426/565 |
| 6,196,712 B1 | 3/2001 | Elm | 366/197 |
| 6,202,894 B1 | 3/2001 | Struminski et al. | 222/129.3 |
| 6,269,973 B1 | 8/2001 | Bennett et al. | 221/1 |
| 6,283,627 B1 | 9/2001 | Fromm | 366/260 |
| 6,293,691 B1 | 9/2001 | Rebordosa et al. | 366/129 |
| 6,338,569 B1 | 1/2002 | McGill | 366/144 |
| 6,490,872 B1 | 12/2002 | Beck et al. | |
| 6,607,096 B2 | 8/2003 | Glass et al. | 222/100 |
| 6,609,821 B2 | 8/2003 | Wulf et al. | |
| 6,616,323 B2 | 9/2003 | McGill | 366/201 |
| 6,684,646 B2 | 2/2004 | Voute et al. | 62/66 |
| 6,689,410 B2 | 2/2004 | Gerber | |
| 6,705,356 B2 | 3/2004 | Barton et al. | 141/2 |
| 6,722,675 B2 | 4/2004 | Bidwell | 280/89 |
| 6,730,348 B2 | 5/2004 | Miller et al. | 426/565 |
| 6,772,675 B2 | 8/2004 | Ervin | 99/275 |
| 6,889,603 B2 | 5/2005 | Carhuff et al. | |
| 6,945,157 B2 | 9/2005 | Brown et al. | 99/275 |
| D526,170 S | 8/2006 | Gugni | D7/706 |
| 7,175,046 B2 | 2/2007 | Yao | 221/265 |
| 7,207,506 B1 | 4/2007 | Dickson, Jr. et al. | 241/21 |
| 7,237,691 B2 | 7/2007 | Danby et al. | 222/103 |
| 7,237,692 B2 | 7/2007 | Bodum | |
| 7,278,275 B2 | 10/2007 | Voglewede et al. | 62/320 |
| D555,678 S | 11/2007 | Broersen et al. | D15/89 |
| 7,325,485 B2 | 2/2008 | Carhuff et al. | |
| 7,383,966 B2 | 6/2008 | Ziesel | 222/100 |
| 7,475,795 B2 | 1/2009 | Faller et al. | 222/95 |
| 7,543,346 B2 | 6/2009 | Roh et al. | |
| 7,614,524 B2 | 11/2009 | Girard et al. | |
| 7,748,571 B2 | 7/2010 | Goff et al. | 222/146.6 |
| 7,942,094 B2* | 5/2011 | Kounlavong et al. | 99/486 |
| 2002/0194999 A1 | 12/2002 | Ervin | |
| 2005/0183426 A1 | 8/2005 | Learned | |
| 2005/0242120 A1 | 11/2005 | Sato et al. | |
| 2007/0084888 A1 | 4/2007 | Santos et al. | 222/631 |
| 2007/0095859 A1 | 5/2007 | Maser et al. | |
| 2007/0205220 A1 | 9/2007 | Rudick et al. | |
| 2007/0205221 A1 | 9/2007 | Carpenter et al. | |
| 2007/0289991 A1 | 12/2007 | Jensen | 222/1 |
| 2008/0089983 A1 | 4/2008 | Coste | 426/106 |
| 2008/0093382 A1 | 4/2008 | Sher et al. | |
| 2008/0279040 A1 | 11/2008 | Neilson | |
| 2009/0120306 A1* | 5/2009 | DeCarlo et al. | 99/485 |
| 2010/0139493 A1 | 6/2010 | Nevarez et al. | 99/275 |
| 2010/0145522 A1 | 6/2010 | Claesson et al. | 700/265 |
| 2010/0318225 A1 | 12/2010 | Claesson et al. | 700/265 |
| 2010/0323071 A1 | 12/2010 | Nevarez et al. | 426/231 |

FOREIGN PATENT DOCUMENTS

| | | |
|---|---|---|
| EP | 1 772 081 A1 | 4/2007 |
| JP | 2004326246 A | 11/2004 |
| WO | 02/082959 A2 | 10/2002 |
| WO | 2008/105107 A1 | 9/2008 |

OTHER PUBLICATIONS

International Preliminary Report on Patentability issued Oct. 26, 2011 in the related PCT/US2009/067229.

*International Search Report* mailed Mar. 2, 2009 in the corresponding PCT/US2009/000247.

*Extended European Search Report* mailed Dec. 21, 2010 in the corresponding PCT/US2009/000247.

International Search Report from corresponding PCT Application No. PCT/US2009/067225 dated Feb. 4, 2010.

International Search Report from corresponding PCT Application No. PCT/US2009/067226 dated Feb. 4, 2010.

International Search Report from corresponding PCT Application No. PCT/US2009/067230 dated Feb. 4, 2010.

International Search Report from corresponding PCT Application No. PCT/US2009/067229 dated Feb. 4, 2010.

International Search Report from corresponding PCT Application No. PCT/US2009/067223 dated Jan. 26, 2010.

International Search Report from the corresponding International Application No. PCT/US2009/067227 dated Feb. 17, 2010.

International Search Report issued Dec. 21, 2010 in the related International Application No. PCT/US2010/054317.

Patent Examination Report No. 1 dated Sep. 21, 2012 for corresponding Australian Patent Application No. 2009333465.

English translation of First Office Action dated Aug. 27, 2012 for corresponding Chinese Patent Application No. 200980137971.8.

Extended European Search Report dated Jul. 23, 2012 for corresponding European Patent Application No. 09836740.2.

Extended European Search Report dated Jul. 23, 2012 for corresponding European Patent Application No. 09836743.6.

Chinese Office Action dated Oct. 23, 2012 for Chinese application No. 200980137874.9.

Chinese Office Action dated Oct. 22, 2012 for Chinese application No. 200980137980.7.

Russian Office Action dated Sep. 21, 2012 for Russian application No. 2011127987.

Australian Examination Report dated Jan. 11, 2013 for Australian application No. 2009324698.

Extended European Search Report dated Sep. 3, 2012 for European application No. 09832454.4.

Extended European Search Report dated Sep. 3, 2012 for European application No. 09836742.8.

Extended European Search Report dated Sep. 3, 2012 for European application No. 09836741.0.

Chinese Office Action dated Sep. 27, 2012 for Chinese application No. 2009-80137700.2.

Second Office Action Dated May 11, 2012 From Chinese Patent Application No. 200980102539.5 With English Translation Consisting of 10 Pages.

International Preliminary Report on Patentability Dated Dec. 4, 2011 From International Application No. PCT/US2010/54317 Consisting of 9 Pages.

International Preliminary Report on Patentability Dated Mar. 30, 2011 From International Patent Application No. PCT/US2009/67227 Consisting of 4 Pages.

International Preliminary Examination Report Dated Mar. 28, 2011 From International Application No. PCT/US2009/67223 Consisting of 11 Pages.

International Preliminary Report on Patentability Dated Feb. 10, 2011 From International Application No. PCT/US2009/67230 Consisting of 10 Pages.

International Preliminary Report on Patentability Dated Nov. 15, 2010 From International Application No. PCT/US2009/67225 Consisting of 15 Pages.

Russian Patent Office action dated Jan. 25, 2013 from corresponding Russian Patent Application No. 2011128012/08(041554), pp. 7.

First Office Action dated Jan. 31, 2013 for corresponding Chinese patent application No. 200980138020.2 with English translation, pp. 17.

First Office Action dated Dec. 17, 2012 for corresponding Chinese patent application No. 200980137873.4 with English translation, pp. 18.

Russian Patent Office action dated Feb. 4, 2013 from corresponding Russian Patent Application No. 2011128014/20(041556), pp. 10.

Australian Patent Office action dated Feb. 11, 2013 from corresponding Australian Patent Application No. 2009333466, pp. 5.

* cited by examiner

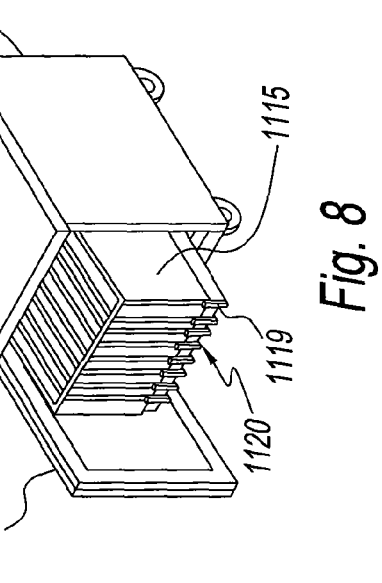
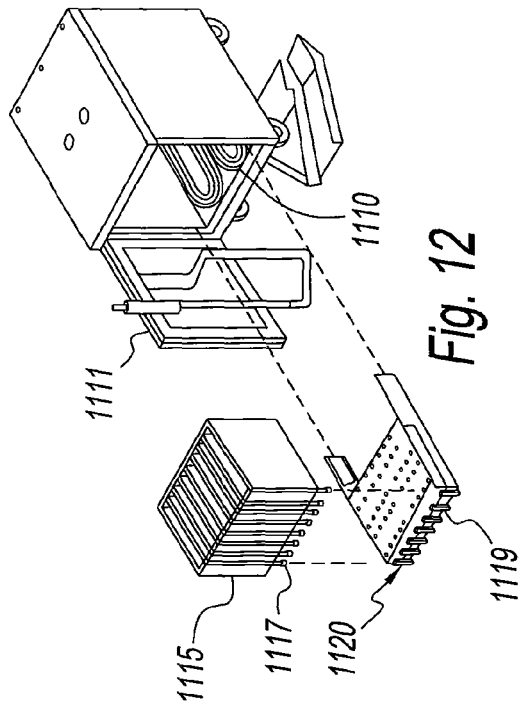
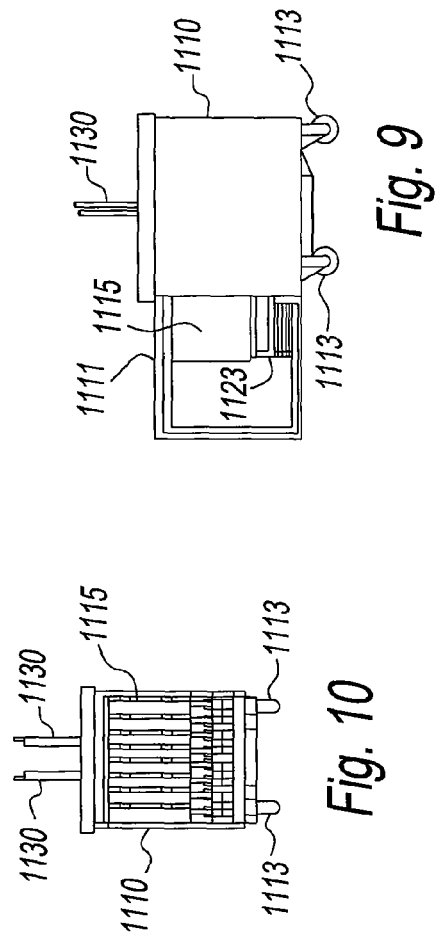
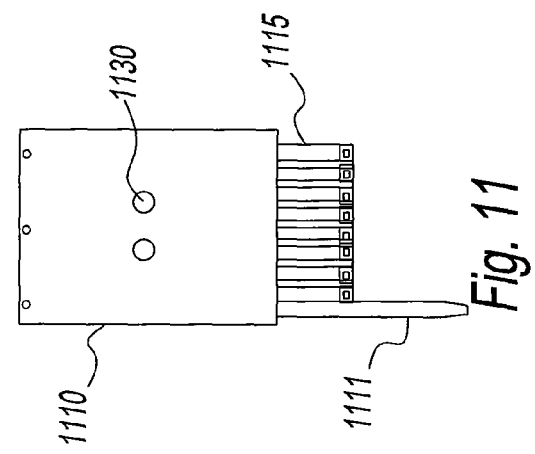

Product Mode

| | Idle - | | | |
|---|---|---|---|---|
| Display/Function | 1. Computer displays "Select Up to 3 Flavors"<br>2. Computer displays up to 7 flavors (configurable) selections located in line with selection soft key and a "Water Only" and "ICE Only" selection located above the right most bottom soft keys respectively. | | | |
| Button | | Press 1-3 flavors OR Ice Only soft keys not cannot select both Ice Only and flavors | Press X to go to system setup | Press check without flavor selections | Pression more than 3 flavors |
| Display/Function | | Display highlights the flavors selected | Display un-highlight selections | Display does not change (stay in Idle) | Display reverse videos the first 3 and does not change unless the same item is selected in which case will toggle to un-select. |
| Botton | Press X to clear selections | Press check to select | | | |
| Display/Function | | 1. Computer displays "Additives and Cup Size"<br>2. Computer displays "Flavor: sel1, and sel3" below where sel1 - sel3 are the flavors previously selected.<br>3. Computer displays three additives available for selection below the top soft keys including Yogurt on the right top key. Note Computer displays additives crossed out if currently unavailable.<br>4. Computer displays four cup size selections "Small" above the bottom left key, "Medium" above the center bottom key, "Large" and "XLarge" above the bottom right most keys respectively. | | | |

Fig. 40

Product Mode

| | | | |
|---|---|---|---|
| Button | — | Press X to go to previous Display | 1. Place cup under dispenser<br>2. If additive desired 1st select up to three additives<br>3. Press soft key under Small, Medium, Large, or XLarge - this starts the dispensing! | Check is disabled |
| Display/Function | — | — | Computer starts dispensing product and Computer displays "Dispensing" with display of cup size, flavors, and additives selected for duration of dispense cycle. | — |
| Botton | — | — | X goes back to Idle and stop dispensing | — |
| Display/Function | — | — | 1. Computer displays "Select Mixer" and "left" under the left most top soft key and "Right" under the right most top soft key for a two dispenser unit<br>2. Computer will display "LEFTL" and "RIGHTL" and "RIGHTR" under the two right most soft keys if this system is configured with four dispenser modules.<br>3. If any of the mixers are busy or not functional the computer will display the appropriate left or right text crossed out. | — |
| Botton | — | — | Press X to go back to Idle, Check is disabled | 1. Press Soft key above available mixer (not crossed out), then computer goes back to idle display.<br>2. Open blender door.<br>3. Place cup and close door<br>4. Computer starts blending with door closure.<br>5. Blending completes (no beep?) then user removes cup and door should close to allow cleaning cycle. |

*Fig. 41*

System Setup Mode
From Idle Press X

| Botton | | | | | | | |
|---|---|---|---|---|---|---|---|
| Display/Function | Computer displays "System Setup" with "DISP. Setup", "LOAD Fluids", and "Service" displayed under the the top left, center and right soft keys. | | | | | | |
| Botton | Press appropriate soft key (DISP Setup, LOAD FLUIDS, or Service) Note other soft keys are disabled | | | | | Press X to go back to Idle Mode | Check disabled ? |
| Display/Function | If DISP Setup was selected then the Computer displays "Brightness" on the left and "Contrast" on the right with + and - symbols on each side above and below the associated soft keys. | If LOAD Fliuds was selected then the Computer displays "Load Fluids" with "Slot 1", "Slot 2", "Slot 3", "Slot 4", and "Slot 5" across the top of the display respectively and "Slot 6" and "Slot 7" across the bottom left of the display respectively. | | If Service was selected then the Computer displays "Status", "Calibrate", "Maint". | | — | — |
| Botton | Press X or Check to go back to Setup screen | Press appropriate soft keys to modify brightness and Contrast | Press one of the slot slections | Press X or Check to go back to Setup screen | If Status pressed | If Calibrate is pressed | If Maint. Pressed |
| Display/Function | — | Press X or Check to go back to service screen? | 1. Computer displays "Assign Fluid Slot X" on the left side of the display where x is the slot number selected previously. 2. Computer displays list of up to 255? Fluid selections with current fluid highlighted with up down arrows under the top and bottom right most soft keys respectively. | — | Computer displays? 1. Temp sensor Values. 2. Error log. 3. # of cycles of each product. 4. | Fluid calibration needed? | 1. Cleaning? 2. Dispensing cleaning fluid? 3. Cycle through modes for service testing? |

Fig. 42a

| | System Setup Mode | | | | | | |
|---|---|---|---|---|---|---|---|
| Botton | — | — | Scroll through product using soft keys and select highlighted fluid by pressing check, Soft keys disabled? Goes back to Load Fluids screen? Primes pump? | — | — | — | Press X to go back to Load Fluids screen |

| | Language Botton |
|---|---|
| Botton | Press language key at any time |
| Display/Function | Current display changes to a new language each time the button is pressed. When starting English the display changes to the languages and order below: <br> 1. Spanish, 2. French, 4. Canadian, 5. German, 6. Swedish, 7. Portuguese, 8. Italian, 9. Chinese, 10. Japanese, 11. back to English |

*Fig. 42b*

INTEGRATED METHOD AND SYSTEM FOR DISPENSING AND BLENDING/MIXING BEVERAGE INGREDIENTS

CROSS-REFERENCED APPLICATION

This application claims priority to U.S. Provisional Application No. 61/120,772, filed on Dec. 8, 2008, which is incorporated herein by reference in its entirety.

BACKGROUND OF THE INVENTION

1. Field of the Invention

The present disclosure relates generally to an integrated method and system for dispensing and blending/mixing beverage flavor/ingredients, thereby producing a beverage, e.g., a smoothie. More particularly, the present disclosure relates to an integrated assembly that includes a flavor/ingredient dispensing module, an ice making and portion control module, and a blender module which is capable of dispensing all primary flavor/ingredients and, optionally, portioning and dispensing onboard manufactured ice into a single serving cup; blending and/or mixing such flavor/ingredients and ice to form a pre-selected beverage; and cleaning the blender shaft, blade and mixing compartment post mixing to avoid flavor contamination and to satisfy health and sanitary regulations.

2. Description of Related Art

Multiple steps are involved in creating a beverage or drink, for example, a smoothie drink, from beginning to end, and potential issues can occur at all stages. Smoothie making requires the use of blender pots to create the drink, meaning that the operator is required to purchase, maintain, and then store small wares (blender pots). Limitations of current technology also require the labor intensive transportation of ice to the smoothie machine from a separate icemaking machine in order to maintain a level of usable ice in the smoothie machine. This ice transfer is an issue for many reasons. First, labor is required to transport the ice typically from a back storage room to the point of sale (POS) counter area of a restaurant, where the smoothie machines are typically located. This ice transfer can create a safety hazard for employees who could slip and fall on wet floors or injure themselves by improperly carrying a heavy bucket. It can also increase the likelihood of ice contamination through mishandling.

Once the ice is stocked, the employee must manually add an estimated amount to the blender pot. Since the amount of ice is not measured, but rather "guesstimated" by each employee, this ingredient is not precise and, therefore, makes it difficult to create the same franchised drink time after time.

After the ice is manually added, the juice and any additional fruit or flavor "mix-in" is added by the operator as well. Finally, a size of cup is chosen, and the drink is poured. This last step presents the largest chance for waste. Since the employee must portion the ingredients by hand, any overspill of the drink is left in the blender pot. At each step during this manual process, portion control is compromised, and money is potentially wasted on excess ingredients.

Once the order is complete and the customer has his or her drink, there is one last step to finalize the process—the method of manually cleaning the blender pot after each use to prevent the transfer of flavors and germs. Often, to save time, the blender pots are rinsed in a sink, which can compromise sanitation. While this might seem insignificant, flavor contamination can be a serious threat if customers have food allergies. Another drawback to the washing process is that it involves a substantial amount of time and labor on the part of the operator.

Each step in this process to create a smoothie takes time, typically four to five minutes, and that time could be better spent serving customers or taking more food and beverage orders, directly contributing to the bottom line.

Although premium beverages such as smoothies are growing in popularity, most quick-service restaurants (QSRs) are unable to offer customers these options due to the time limitations of the quick-serve world. Those QSR owners that do opt to serve smoothies are confronted with a common set of challenges—mainly how to sell the same franchised drink time after time with existing labor and equipment limitations.

Accordingly, it has been determined by the present disclosure, there is a need for an assembly that dispenses and mixes beverage flavors/ingredients with ice in one integrated system, and thereafter self cleans for immediate reuse without subsequent flavor contamination. It has been further determined by the present disclosure, there is a need for an assembly for dispensing ice that uniformly dispenses ice. It has been further determined by the present disclosure, there is an additional need for an assembly for mixing a beverage which is capable of automatically rinsing/cleaning/sanitizing the blender housing, blender shaft and blender blade.

SUMMARY

An integrated beverage blending system comprising: at least one system controller; an ice portioning module; an ingredient module; a dispensing apparatus in communication with the ice portioning module and/or the ingredient module; a blender module with an integrated cleaning apparatus.

Preferably ice from the ice portioning module and at least one ingredient from the ingredient module are dispensed into a beverage container via the dispensing apparatus; and wherein the beverage container with the ice and the ingredient is placed in the blender module for blending and/or mixing the ice and the ingredient in the beverage container, thereby producing the beverage.

Upon removal of the beverage container from the blender module, the system initiates a cleaning mode of the blender module via the cleaning apparatus.

The system further comprising an ice maker which is in communication with the ice portion control module. The system further comprising an ice crusher/grinder which is communication with the ice portion control module. The system further comprising an ice shaver which is communication with the ice portion control module. The system further comprising a flake ice or nugget ice apparatus which is in communications with the ice portion control module.

The ingredient module dispenses at least one beverage flavor and/or other ingredient. The beverage container preferably is a single serving cup which receives the dispensed ice and ingredients, is used to blend the beverage in the blending module and then is delivery directly to the consumer, thereby avoiding the need to transfer to another serving cup and also avoiding the need for cleaning of the single serving cup after use.

Preferably, the system controller comprises a menu selection controller with a touch screen display allowing for the customizing of a beverage selection.

The ingredient module comprises: a housing, at least one ingredient container disposed within the housing, an ingredient conduit disposed between the ingredient container and the dispensing apparatus, and an actuator that moves the ingredient from the ingredient container, through the ingredient conduit and into the dispensing apparatus under pressure and/or gravity.

The ice portion control module comprises: an ice bin for storing ice; a rotatable base of the ice bin having at least one portion control compartment; at least one leveling blade that ensures consistent volume of the ice in each portion control compartment; a dispensing port in communication between a selected portion control compartment and the dispensing apparatus, thereby allowing ice in the compartment to be dispensed into the dispensing apparatus; and a sensor in communication with the controller which determines the amount of ice which is dispensed into the dispensing apparatus.

Preferably, an agitator is used to prevent ice in the ice bin from congealing which would prevent ice from entering into the rotatable base.

Alternatively, the ice portion control module comprises: an ice bin for storing ice which incorporates one or more sloped walls to feed ice into a dispensing port, thereby allowing ice in the compartment to be dispensed into the dispensing apparatus; and a sensor in communication with the controller which determines the amount of ice which is dispensed into the dispensing apparatus.

The rotatable base is formed by a pair of oppositely disposed first and second plates, wherein one or more compartments are formed by at least one sidewall disposed between the first and second plates, wherein the first plate comprises an opening associated with each the compartment to allow the ice to move from the bin into each the compartment, and wherein the second plate includes drainage holes which allow for water to drain from the ice disposed within each the compartment.

Alternatively, the rotatable base is formed by a plate and at least one compartment wherein the compartment is formed by at least one vertical sidewall attached to the plate, wherein the plate comprises an opening associated with the compartment to allow the ice to move from the bin into the compartment, and wherein the compartment includes drainage holes which allow for water to drain from the ice disposed within the compartment.

The ice portion control module further comprises a rotatable shaft connected to a motor which rotates the rotatable base, and the at least one leveling blade to ensure consistent portion of ice, wherein the first plate and the sidewall rotate together with the rotatable shaft, while the second plate remains stationary and wherein the dispensing port is disposed within the second plate to allow the contents of each compartment to be removed therefrom when the compartment is aligned with the dispensing port.

Alternatively, the ice portion control module further comprises a rotatable shaft connected to a motor which rotates the rotatable base, and the at least one leveling blade to ensure consistent portion of ice, wherein the plate and the sidewall rotate together with the rotatable shaft and wherein the dispensing port is disposed within the plate to allow the contents of each compartment to be removed therefrom when the compartment is aligned with the dispensing port.

The blender module comprises: a housing; a door which provides access to the interior of the housing; a spindle and blade used to blend and/or mix the ice and ingredient to form the beverage; a container seal disposed about the spindle which is capable of sealing the beverage container during blending and/or mixing, as well as preventing the beverage container from rotating thereabout; and a container holder.

Alternatively, the blender module comprises: a housing; a door which provides access to the interior of the housing; a spindle and blade used to blend and/or mix the ice and ingre-
dient to form the beverage; a container seal disposed about the spindle which is capable of sealing the single serving cup during blending and/or mixing, as well as preventing the single serving cup from rotating thereabout; and a container holder.

The system further comprises a water and/or cleaning solution supply system connected to the container holder for cleaning at least the interior of the housing, the spindle, the blade and the container seal after use.

The cleaning mode is preferably activated subsequent to the last mixing sequence and returning of the door to the closed position. The system further comprises at least one beverage container holder.

The system controller provides integrated control between the ice portioning module, the ingredient module, and blender module, based upon a menu selection from the system controller. The system controller further activates the cleaning apparatus.

The system further comprises a point-of-sale device which is in communication with the system controller, whereby beverage orders taken at the point-of-sale device initiate a menu selection within the system controller.

The blender module blends and/or mixes the ice and the ingredient in the beverage container based upon blending and/or mixing instructions communicated from the system controller.

The dispensing apparatus is a dispensing nozzle comprising an ice dispensing conduit and a plurality of ingredient conduits disposed about the ice dispensing conduit, wherein each ingredient conduit is isolated from other ingredient conduits and the ice dispensing conduit, whereby ingredient contamination is avoided. The ingredient conduits comprises a heat transfer device disposed about the ingredient conduit, thereby controlling the temperature of the ingredient passing through the ingredient conduit.

The system further comprising a plurality of the blender modules which can operate either simultaneously or separately. The system further comprising a plurality of the dispensing apparatus and blender modules with the integrated cleaning apparatus which can operate either simultaneously or separately. When the plurality of blender modules are used, the system further comprising an indicator which is capable of generating a signal indicative of which blender module is in use or not in use. The blender module includes a variable speed and direction motor to move the spindle.

A method for producing at least one beverage, the method comprising: selecting a beverage from a menu; portioning and/or dispensing of ice and/or at least one ingredient into a beverage container, based upon the menu selection; positioning the beverage container with the ice and the beverage ingredient into an interior of a housing of the blender module, the blender module comprising an integrated cleaning apparatus; blending and/or mixing the ice and the ingredient in the beverage container while disposed in the blender module, thereby producing the beverage; and initiating a cleaning mode wherein, upon completion of the blending and/or mixing process and removal of the beverage container from the blender module, the interior of the blender module is cleaned for subsequent usage.

The beverage container is a single serving cup in which the beverage is blended and/or mixed and thereafter served directed to the consumer in the cup.

The method further comprising the step of producing ice prior to the step of portioning and/or dispensing of ice.

The menu is displayed on a touch screen allowing for the customizing of a beverage selection.

The method further comprising an agitator to prevent ice in the ice bin from congealing which would prevent ice from entering into the rotatable base.

The blending and/or mixing, and cleaning mode take place in a blender module which comprises: a housing; a door which provides access to the interior of the housing; a spindle and blade used to blend and/or mix the ice and ingredient to form the beverage; a container seal disposed about the spindle which is capable of sealing the beverage container during blending and/or mixing, as well as preventing the beverage container from rotating thereabout; and a container holder.

The method further comprising supplying water and/or a cleaning solution to the container holder for cleaning at least the interior of the housing, the spindle, the blade and the container seal after use.

The method further comprising the step of: activating the cleaning mode subsequent to the last blending and/or mixing sequence and returning the door to the closed position.

A controller provides integrated control between the menu selection, portioning and dispensing of ice, and dispensing of the ingredient(s) based upon the menu selection, and blending and/or mixing based upon the menu selection.

The method further comprising the step of activating the cleaning mode via the controller. Preferably, the step of selecting from a menu is automatically done from a point-of-sale device.

Preferably, the steps of dispensing the ice and the ingredients are performed by a dispensing apparatus, wherein the dispensing apparatus is a dispensing nozzle which comprises a centrally disposed ice dispensing conduit and at least one ingredient conduit disposed about the ice dispensing conduit, wherein the ingredient conduit is isolated from any other ingredient conduits and the ice dispensing conduit, whereby ingredient contamination is avoided.

Preferably, a plurality of beverages are produced in stages or simultaneously. The method further comprising the step of operating a plurality of blender modules simultaneously, when a plurality of beverages are to be produced substantially simultaneously. When a plurality of beverages are produced in stages, the beverage container containing the ice and the ingredient is either (a) being blended and/or mixed or (b) being cleaned, while an additional beverage container is being filled with the ice and/or the ingredient. When a plurality of blender modules are used, further providing a signal indicative of which blender module is in use or not in use.

The blender module includes a variable speed and direction motor to move the spindle.

A refrigerated beverage and blending system comprising: a controller for system operation; an ice portioning module utilizing a positive displacement method; an ingredient module; a dispensing apparatus in communication with the ice portion control module and the ingredient module, wherein the ice and the ingredient are dispensed into a beverage container via the dispensing apparatus; and at least one blender module with integrated cleaning apparatus which blends and/or mixes the ice and the ingredient in the beverage container, thereby producing the beverage;

Optionally, the ice portion control module comprises: an ice bin for storing ice; an ice portion dispensing system which comprises a tipping beam where a counterbalance on one side is balanced when a equal weight of ice is dispensed on the other side causing it to tip into the dispensing apparatus. Preferably, the number of tips is used to provide the required portion; and further comprising a dispensing port in communication between a selected portion control compartment and the dispensing apparatus, thereby allowing ice in the compartment to be dispensed into the dispensing apparatus; and a sensor in communication with the controller and which determines the amount of ice which is dispensed into the dispensing apparatus The ice portion control module comprises: an ice bin for storing ice which incorporates a sloped walls to feed ice into a dispensing port in communication between a selected portion control compartment and the dispensing apparatus, thereby allowing ice in the compartment to be dispensed into the dispensing apparatus; and a sensor in communication with the controller and which determines the amount of ice which is dispensed into the dispensing apparatus. The portion control compartment is disposed within the dispensing port comprises a plurality of rotatable plates disposed above and below the dispensing port. The dispensing port is of a predetermined volume. The system further comprising at least one sensor in communication with the controller in the dispensing port detect the presence of ice and cause the plates to rotate. The controller in communication with the dispensing port determines the volume of ice dispensed.

An integrated beverage blending system comprising: a controller for system operation; an ice portioning module for portioning and dispensing of ice; an ingredient module for portioning and dispensing of at least one ingredient; a single serving container; a dispensing apparatus in communication with the ice portioning module and/or the ingredient module for dispensing the ice and the ingredient into the single serving container; and a blender module with integrated cleaning apparatus, wherein the blender module blends and/or mixes the ice and the ingredient in the single serving container to delivery to the consumer.

An assembly for dispensing and mixing a beverage is provided that includes an ice dispenser assembly, an flavor/ingredient dispensing module, and a blender module as one integrated assembly.

An assembly for dispensing ice is also provided that includes one or more single serving cups that are fillable with ice. The one or more cups each have a predetermined size to hold a predetermined amount of the ice to dispense a predetermined amount of ice.

A mixer for mixing a beverage is further provided that includes a housing. A mixer is positioned within housing. One or more apertures are within the housing to dispense a liquid within the housing to rinse and/or sanitize the housing and/or mixer.

Preferably, a plurality of beverages are produced in stages or simultaneously. When a plurality of beverages are produced simultaneously, a plurality of blender modules are operating simultaneously. When a plurality of beverages are produced in stages, the beverage container containing the ice and the ingredient is either (a) being blended and/or mixed or (b) being cleaned, while an additional beverage container is being filled with the ice and/or the ingredient. When a plurality of blender modules are used, further providing a signal indicative of which blender module is in use.

The above-described and other advantages and features of the present disclosure will be appreciated and understood by those skilled in the art from the following detailed description, drawings, and appended claims.

BRIEF DESCRIPTION OF THE DRAWINGS

FIG. 8 is a front perspective view of an ingredient dispensing module according to the present disclosure;

FIG. 9 is a side view of the ingredient dispensing module of FIG. 8;

FIG. 10 is a front view of the ingredient dispensing module of FIG. 8;

FIG. 11 is a top view of the ingredient dispensing module of FIG. 8;

FIG. 12 is an exploded view of the ingredient dispensing module of FIG. 13;

FIG. 40 is a listing of controller steps for selecting ingredients/flavors, additives and serving cup size according to the present disclosure;

FIG. 41 is a listing of controller steps for dispensing ingredients into a pre-selected serving cup size, selecting which blending/mixer module is to be activated and activating the selected blender according to the present disclosure; and FIGS. 42*a* and *b* are a listing of controller steps and displays for a system setup mode according to the present disclosure.

DETAILED DESCRIPTION OF THE INVENTION

Figure 1:
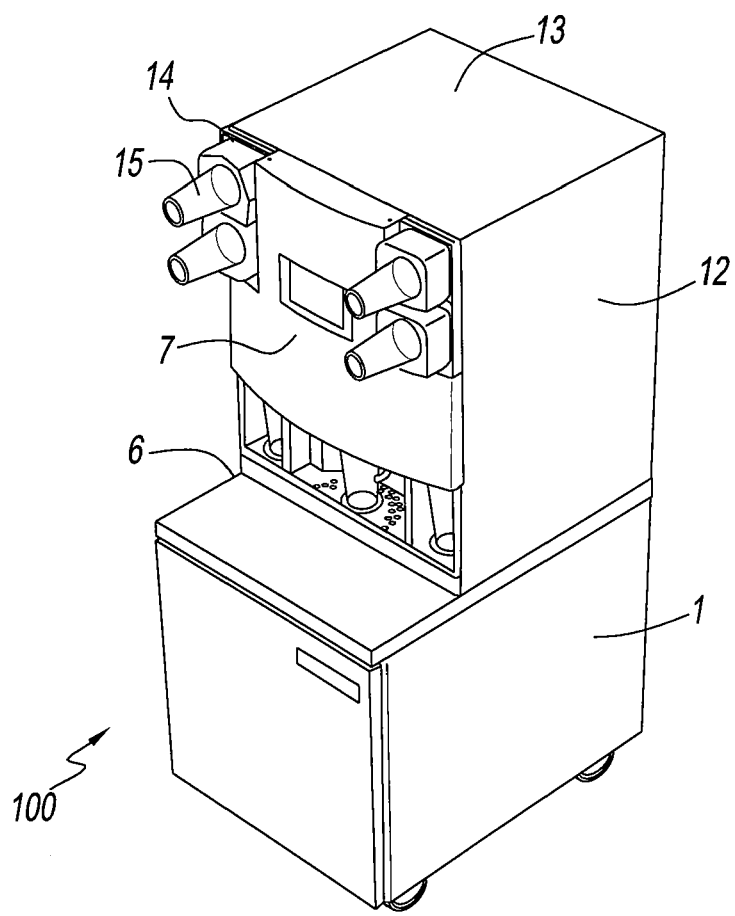
FIG. 1 is a front perspective view of an exemplary embodiment of a system that dispenses and mixes beverages according to the present disclosure.
Figure 4:
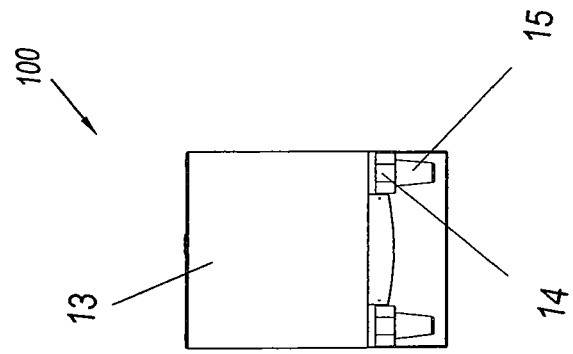
FIG. 4 is a top view of the assembly that dispenses and mixes beverages of FIG. 1.
Figure 3:
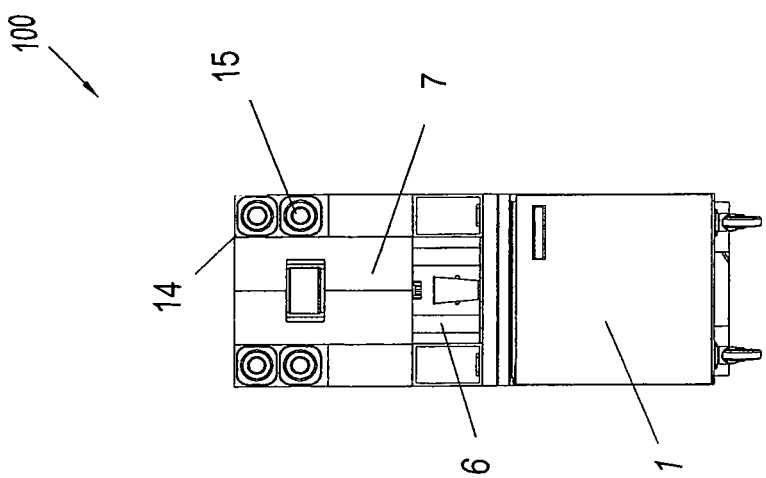
FIG. 3 is a front view of the assembly that dispenses and mixes beverages of FIG. 1.
Figure 2:
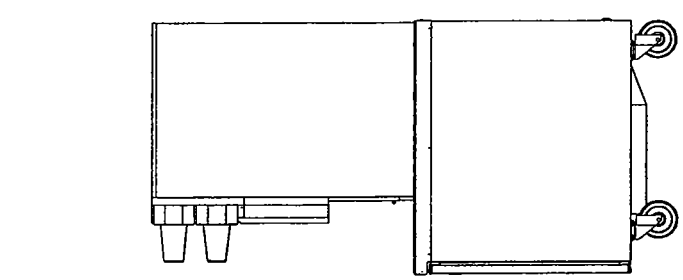
FIG. 2 is a side view of the assembly that dispenses and mixes beverages of FIG. 1.
Figure 5:
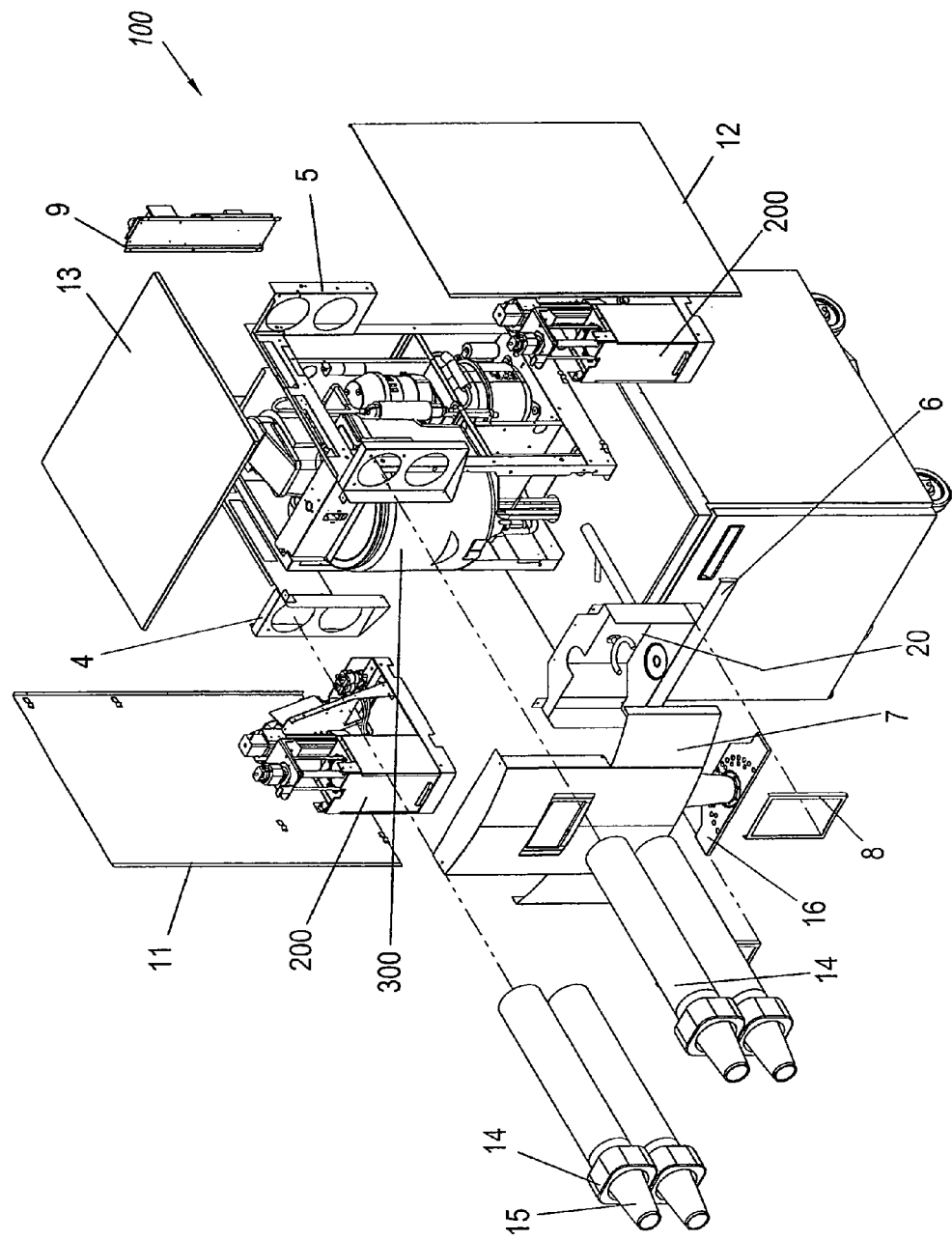
FIG. 5 is an exploded view of the assembly that dispenses and mixes beverages of FIG. 1.

Referring to the drawings and in particular to FIGS. 1-5, an exemplary embodiment of an assembly that dispenses and mixes beverages ("assembly"), according to the present disclosure is generally referred to by reference numeral 100. Assembly 100 makes ice, dispenses flavors/ingredients and ice into a serving cup 15, and then blends or mixes to form a beverage. One such beverage, for example, is a smoothie that preferably includes a flavor ingredient and ice mixed together. Assembly 100 has an onboard ice maker, ice storage and portion control module 300, a flavor/ingredient dispensing module 1100, and a blender module 303. Assembly 100 shows ice maker, ice storage and portion control module 300, flavor/ingredient dispensing module 1100, and blender module 303 as one integrated assembly. It is contemplated by the present disclosure that one or more of ice maker, ice storage and portion control module 300, flavor/ingredient dispensing module 1100, and blender module 303 may be separate from assembly 100, however, it is preferable that they are all integrated into a single assembly 100. That is, vertical placement of ice maker, ice storage and portion control module 300, flavor/ingredient dispensing module 1100, and blender module 303 reduces a size of assembly 100 and its associated flooring footprint in comparison to three separate and distinct machines.

Assembly 100 has a housing that includes a lower wall 6, an upper wall 7, side walls 11 and 12, and a top wall 13. Lower wall 6 has a container holder portion 20. The housing connects cup supports 4 and 5 that secure cup holders 14 to assembly 100. Cup holders 14 removably hold cups 15 therein. Cup 15 may be disposable or reusable single serving cups. If cup 15 is disposable, such as, for example, paper or plastic cups, the beverage dispensed and mixed within cup 15 may be served directly to a customer eliminating the step of pouring the beverage into a serving cup and eliminating labor needed to wash an additional container. Cup 15 may be any size, such as, for example, about 10 ounces to about 32 ounces.

Figure 6:
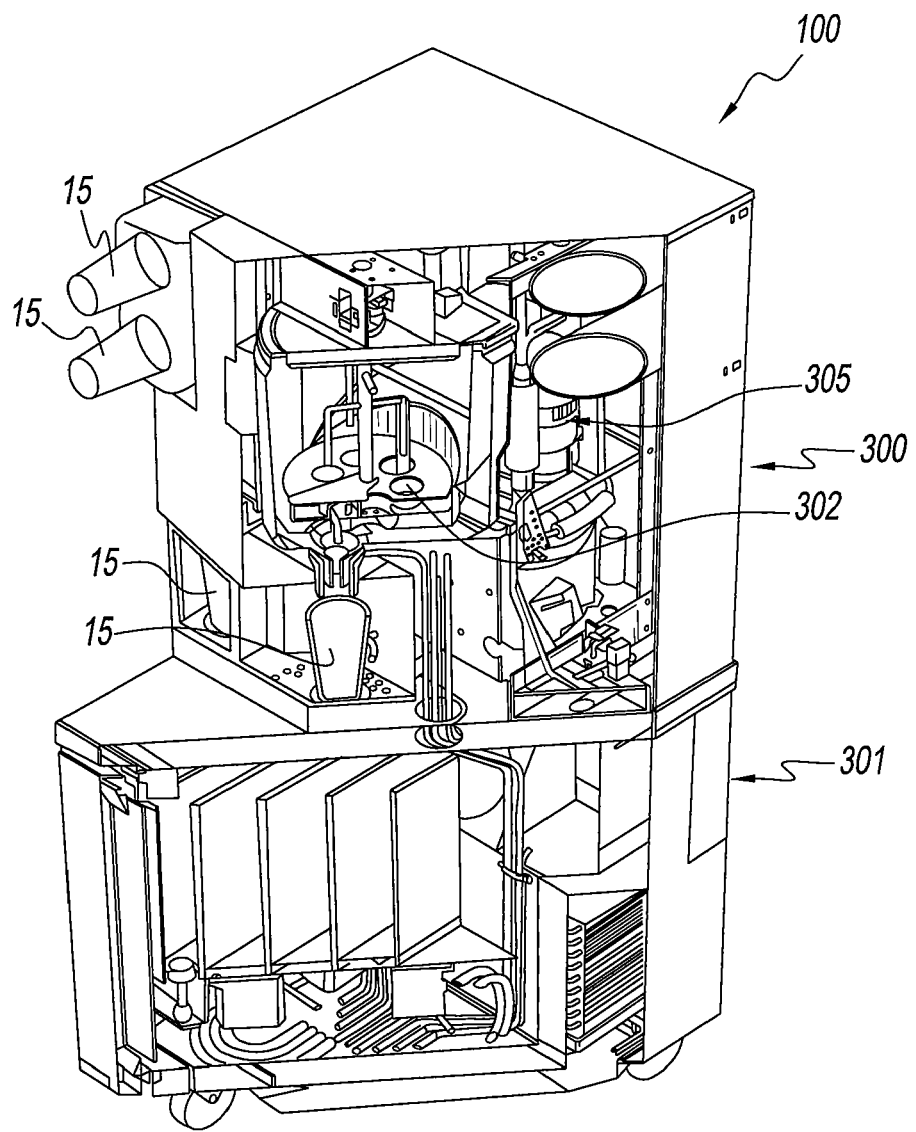
FIG. 6 is a top front left-side perspective view of the system of the present disclosure wherein the front left-side portion has been cut away to depict each of the ice making and portioning module, and dispensing module.
Figure 7:
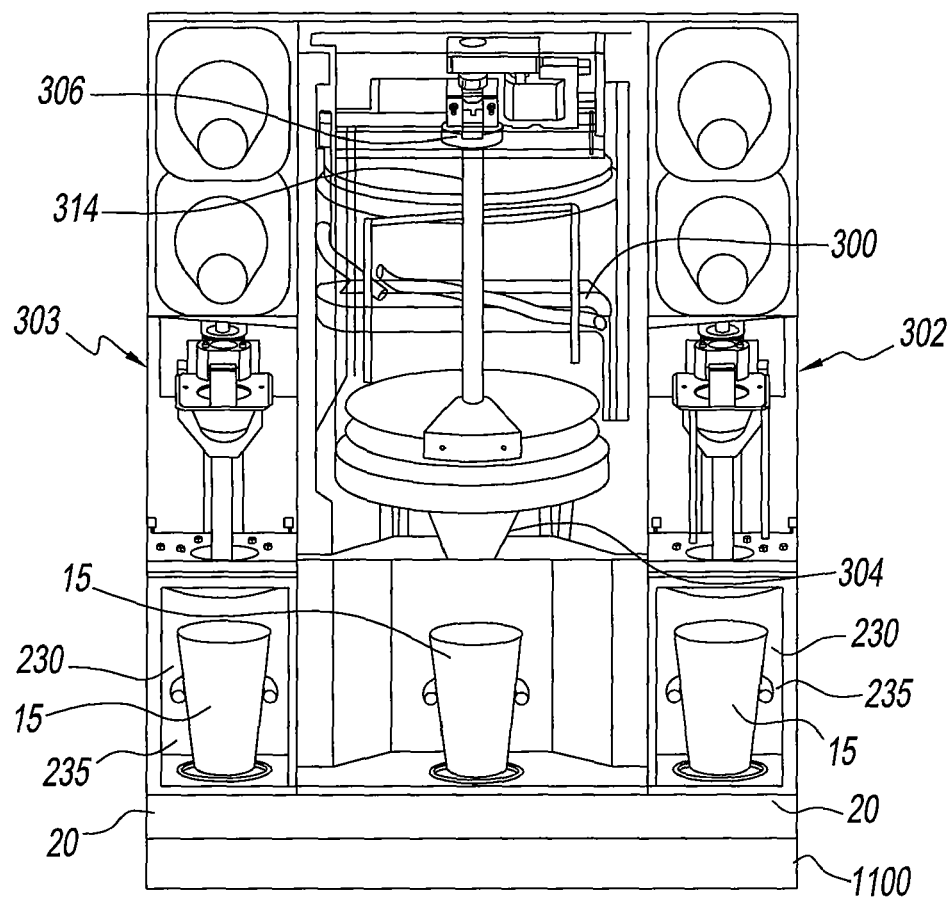
FIG. 7 is a partial front cross-sectional view of the integrated ice maker bin and portion control assembly, dispensing nozzle and pair of oppositely disposed mixer/cleaning modules according to the present disclosure.

FIGS. 6 and 7 provide a overview of the integrated assembly 100 according to the present disclosure, wherein assembly 100 comprises: flavor/ingredient dispensing module 301, ice maker, ice storage and portion control module 300 and a pair of blender modules 303 disposed on opposite sides of dispensing nozzle 304. Ice maker, ice storage and portion control module 300 includes an ice maker 305. Ice maker 305 may be any ice maker, and, preferably an ice maker that forms flakes of ice. For example, ice maker 305 may include an ice making head of cylindrical configuration in which a water container that is filled with water from a water source has at least one refrigerated wall forming a freezing chamber cooled by a flow of refrigerant gas, and a motor driven scraper which continuously breaks up ice forming on the refrigerated surface into ice flakes. The refrigerant gas may be cooled by a refrigeration cycle, such as, for example, a vapor compression cycle that includes a compressor, condenser, expansion valve, and evaporator. One or more of the compressor, condenser, expansion valve, and evaporator may be integral with assembly 100 or remote from the rest of assembly 100. For example, compressors may create undesirable noise and may be remotely located from the rest of assembly 100. Ice maker 305 may include an axially-extending auger or auger assembly that is rotatably disposed within the freezing chamber and generally includes a central body portion with one or more generally spirally-extending flight portions thereon disposed in the space between the central body portion and the refrigerated wall in order to rotatably scrape ice particles from the cylindrical freezing chamber. A drive means assembly rotatably drives the auger such that when make-up water is introduced into the freezing chamber through a suitable water inlet and frozen therein, the rotating auger forcibly urges quantities of ice particles through the freezing chamber to be discharged through an ice outlet end.

Nugget ice may be made from the flakes by passing the flakes of ice through an extruder head where a nugget shape is formed. Nugget ice is different from cube style ice in that the nugget is not homogenous but is multiple flakes of ice compressed into a nugget. Nugget ice is softer ice (easier to chew) that requires less power to mix into a beverage. Ice maker, ice storage and portion control module 300 is shown as mounted as an integral part of assembly 100 but can be located remotely and ice mechanically transported to assembly 100. The nuggets of ice are pushed through the extruder head and this force can be used to transport the ice to assembly 100, which may allow for larger ice output. Ice maker 305 reduces an overall sound level and allows for operation near a front counter or drive-through window without impacting communications. The use of nugget ice also allows the operate to use single serving cup for dispensing, blending and serving the consumer because the stress of blending cubed ice is reduced.

Referring to FIGS. 8-17, flavor/ingredient dispensing module 1100 is shown. Referring to FIG. 12, flavor/ingredient dispensing module 1100 has a refrigerated housing 1110. Refrigerated housing 1110 includes a refrigeration cycle, such as, for example, a vapor compression cycle that includes a compressor, condenser, expansion valve, and evaporator. One or more of the compressor, condenser, expansion valve, and evaporator may be integral with flavor/ingredient dispensing module 1100 or remote from the rest of flavor/ingredient dispensing module 1100. For example, compressors may create undesirable noise and may be remotely located from the rest of assembly 100.

Figure 13:
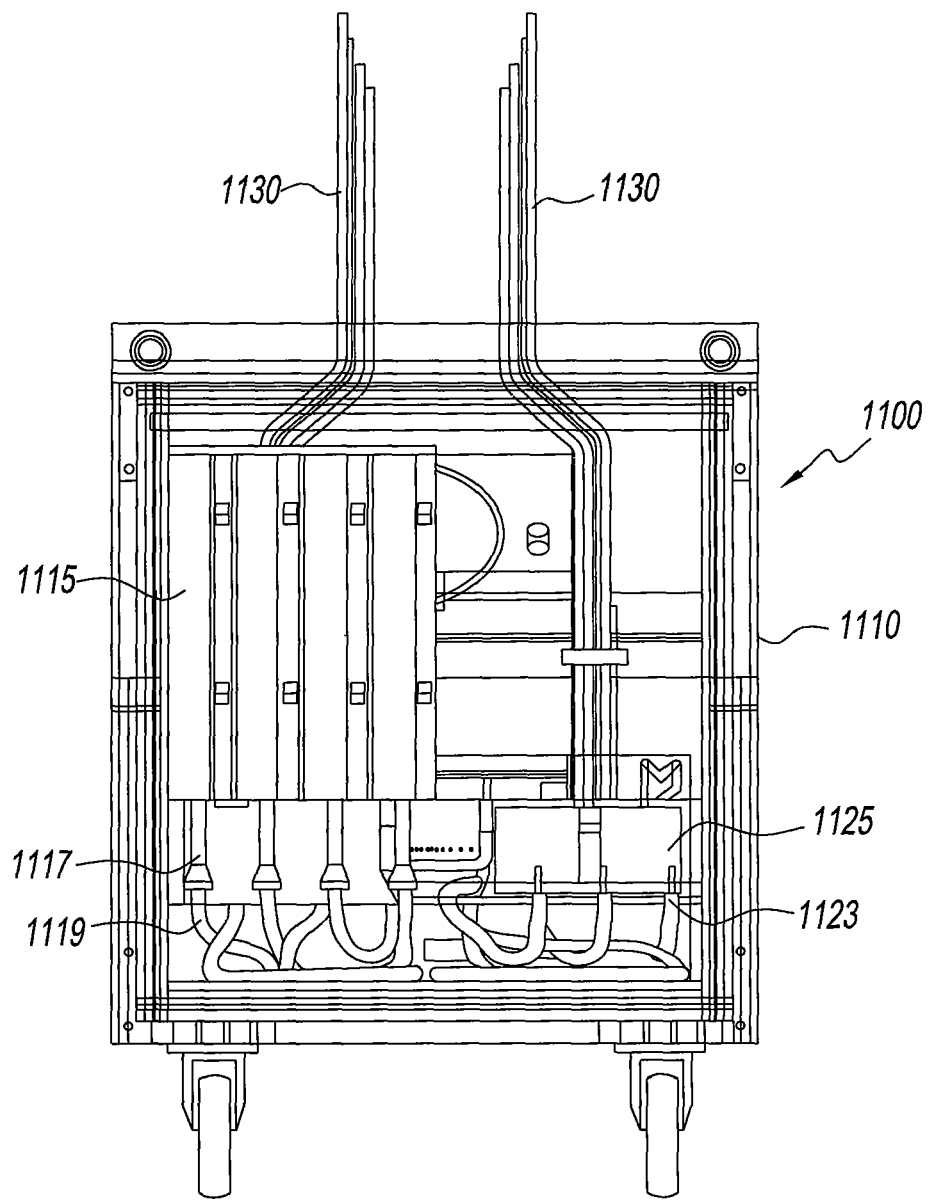
FIG. 13 is a front perspective view of an ingredient dispensing module according to the present disclosure.
Figure 13A:
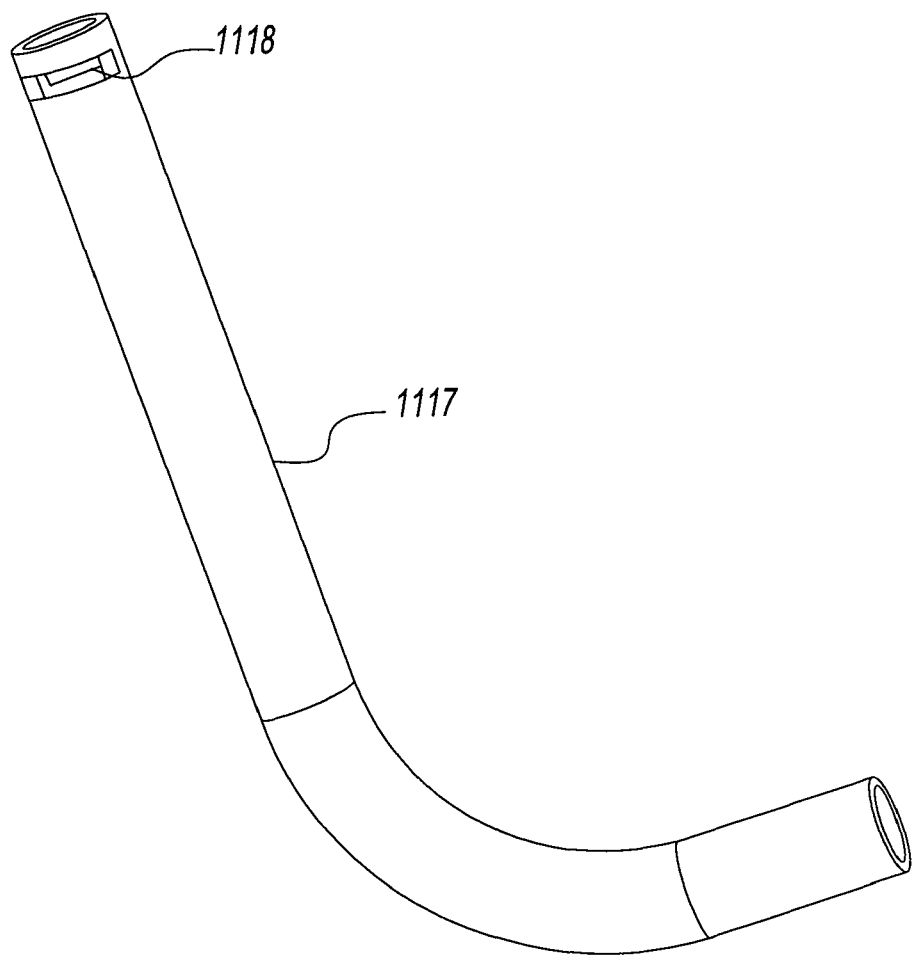
FIG. 13*a* is a connection apparatus for use with the ingredient dispensing module of FIG. 13.

Refrigerated housing 1110 cools one or more holders or cassettes 1115. Holders 1115 each hold a flexible container via a hanging rod 1117 (see FIG. 17, such as, for example, a bag, that contains an ingredient for the beverage. The bag may be a 2.5 gallon bag. The ingredient may be a flavored liquid or mix. The ingredient is cooled while stored in holders 1115 by refrigerated housing 1110 having a door 1111 and wheels 1113. Each of holder has a connection aperture 1117 with a gap 1118 (see FIG. 13a) for allowing substantially all of the flavor/ingredient disposed in container 1115 to be removed without concern regarding the collapsing of the bag (not shown). Connection aperture 1117 of each of holders 1115 is connected to a conduit 1119 that passes through a base 1120. As shown in FIG. 13, conduit 1119 may connect to a pump rack 1123. Pump rack 1123 has one or more pumps 1125 that selectively move a portion of the ingredient from the bag/container in holders 1115 through connection aperture 1117, to conduit 1119, to a line conduit 1130, and to dispenser nozzle 304 to dispense the ingredient out of assembly 100, for example, to cup 15. The ice and the ingredient are dispensed into cup 15 but are segregated from each other until dispensed into cup 15 to prevent contamination. There is an ingredient dispense tube for each ingredient in each of holders 1115 and one ice nozzle in nozzle 304. See FIGS. 15 and 16 for a view of nozzle 304 formed by injection molding of a plastic material to provide an ice chute conduit 1126 centrally disposed within nozzle 304 and a plurality of flavor/ingredient dispensing apparatus 1127

Figure 14:
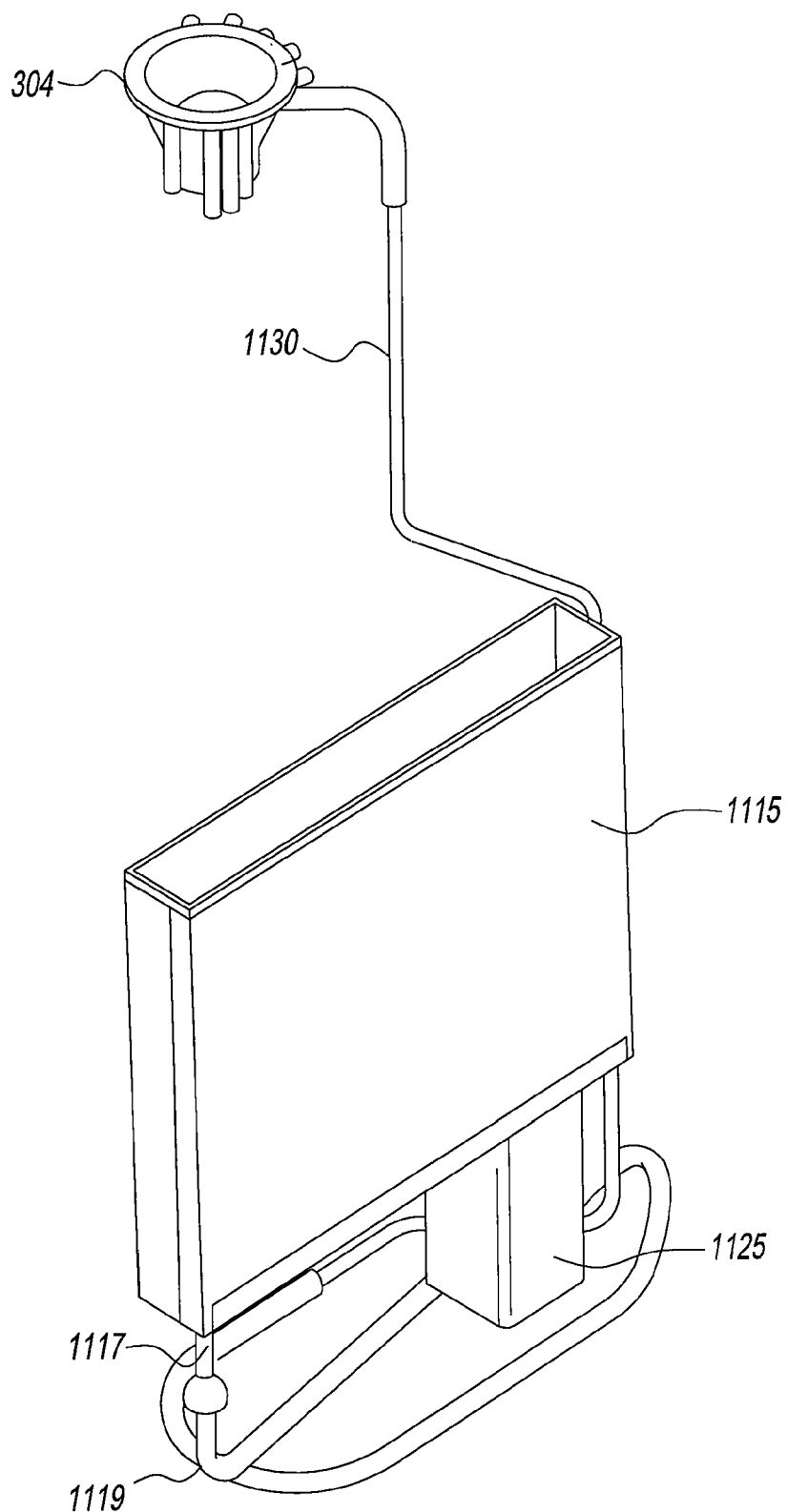
FIG. 14 is a front perspective view of an flavor/ingredient dispensing module according to the present disclosure.
Figure 15:
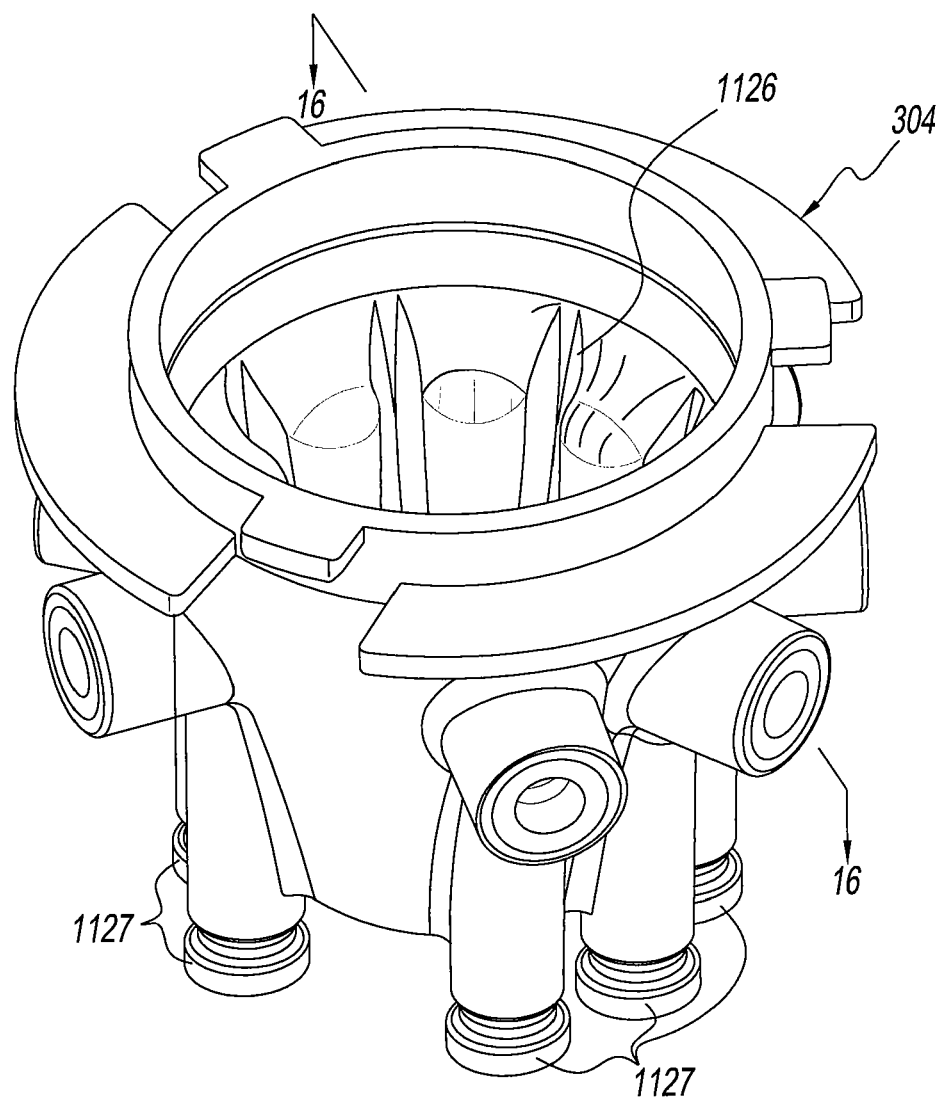
FIG. 15 is a top front side perspective view of a ice chute and ingredient dispensing nozzle according to the present disclosure.
Figure 16:
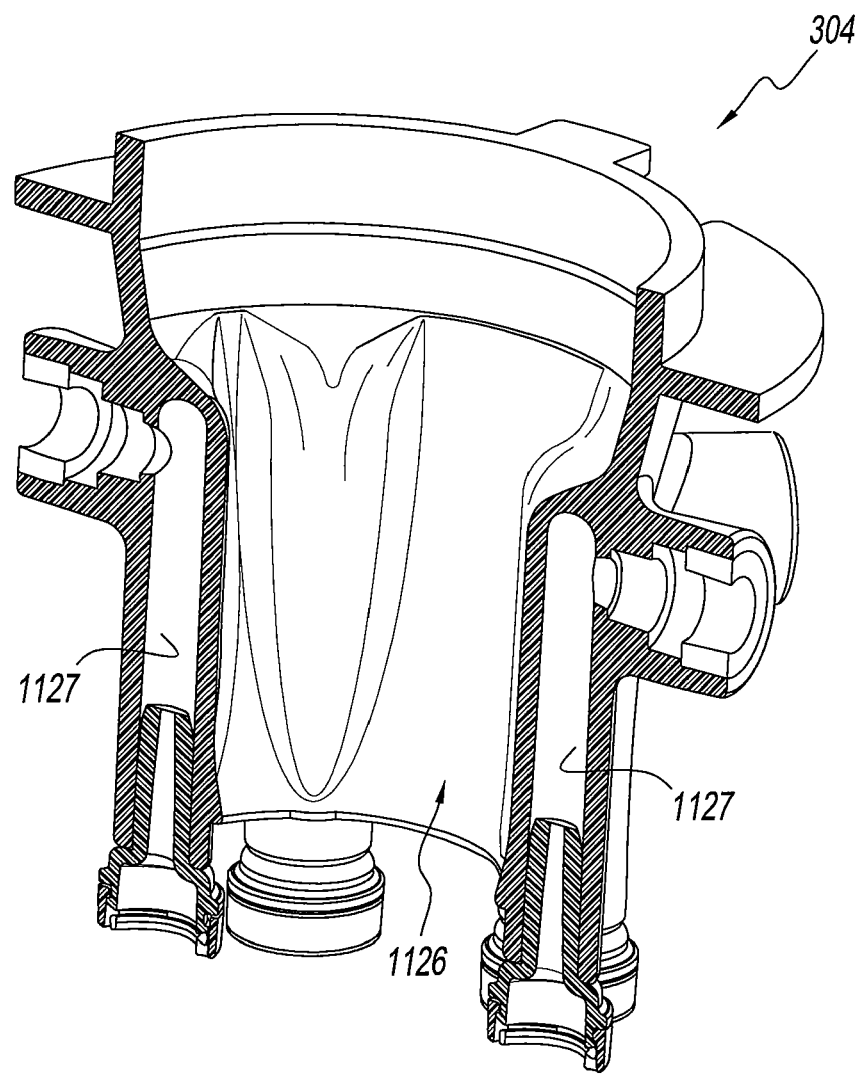
FIG. 16 is a cross-sectional view of the nozzle of FIG. 15 along line 16-16.
Figure 17:
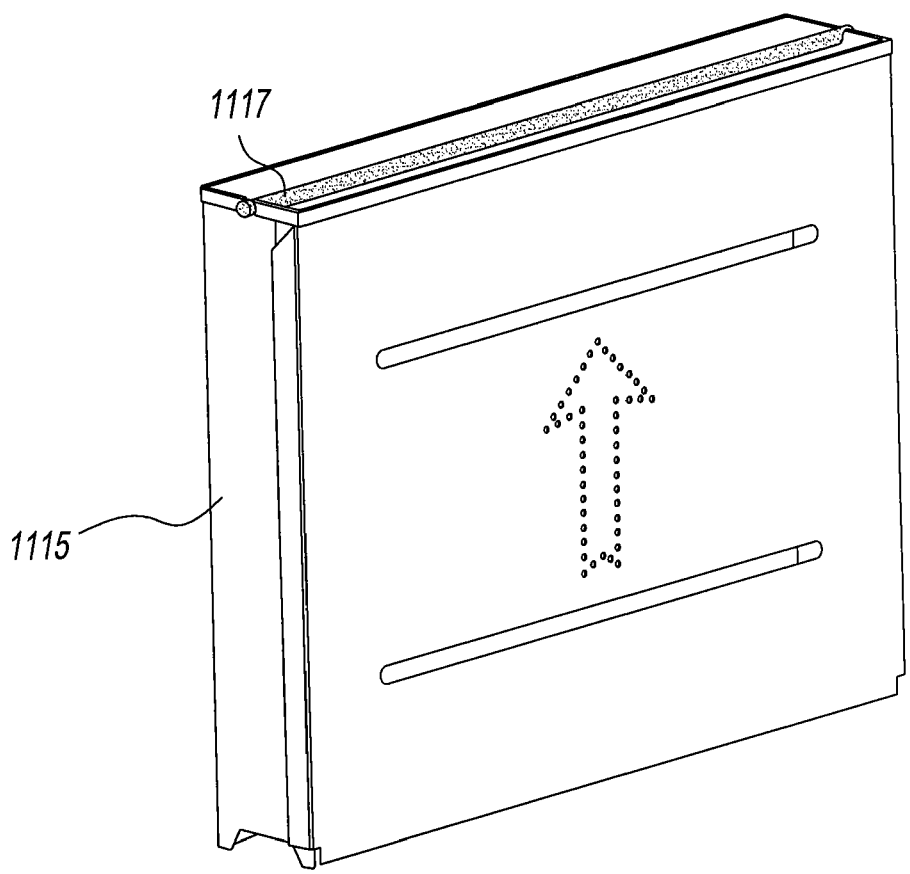
FIG. 17 is a top front right side perspective view of a ingredient dispensing cassette with a support bar according to the present disclosure.
Figure 18:
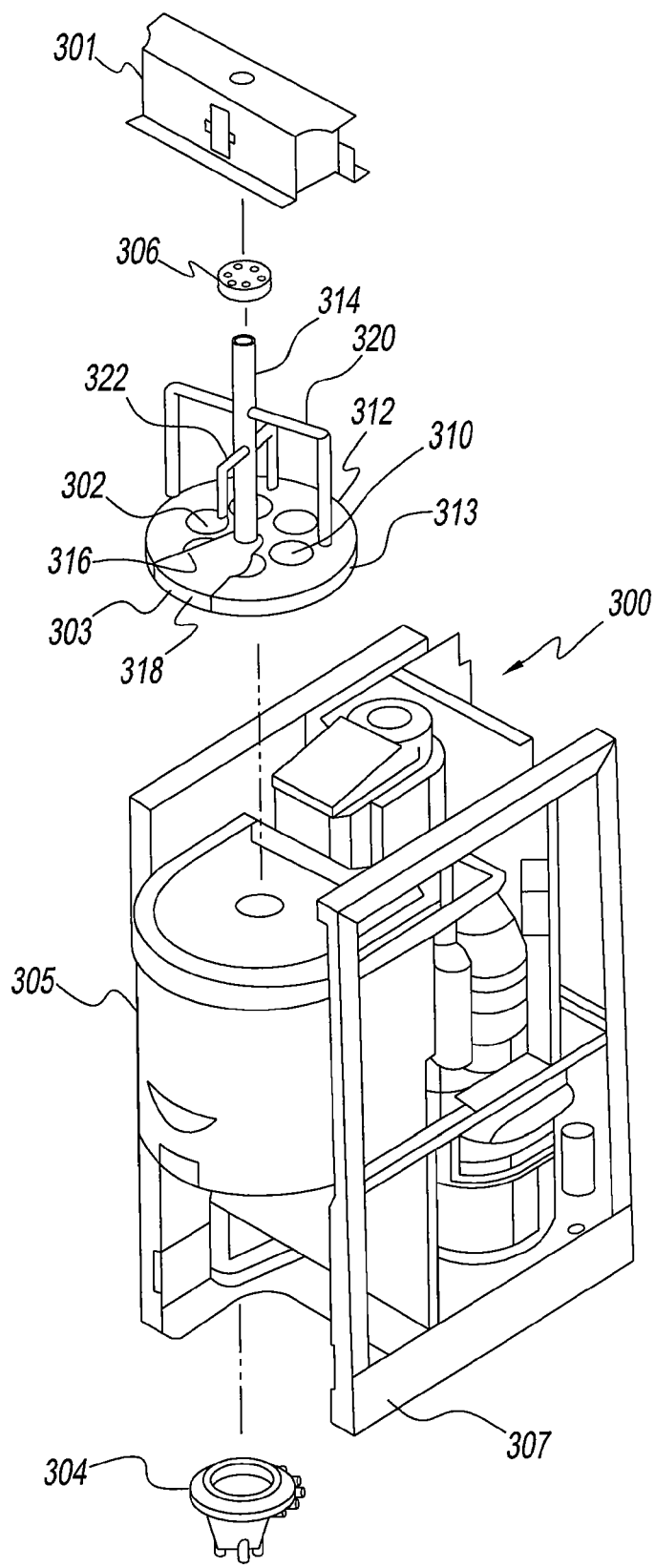
FIG. 18 is a top front right side perspective view of an ice dispensing module according to the present disclosure, wherein the ice portion control assembly has been removed therefrom and shown in an exploded view.
Figure 19:
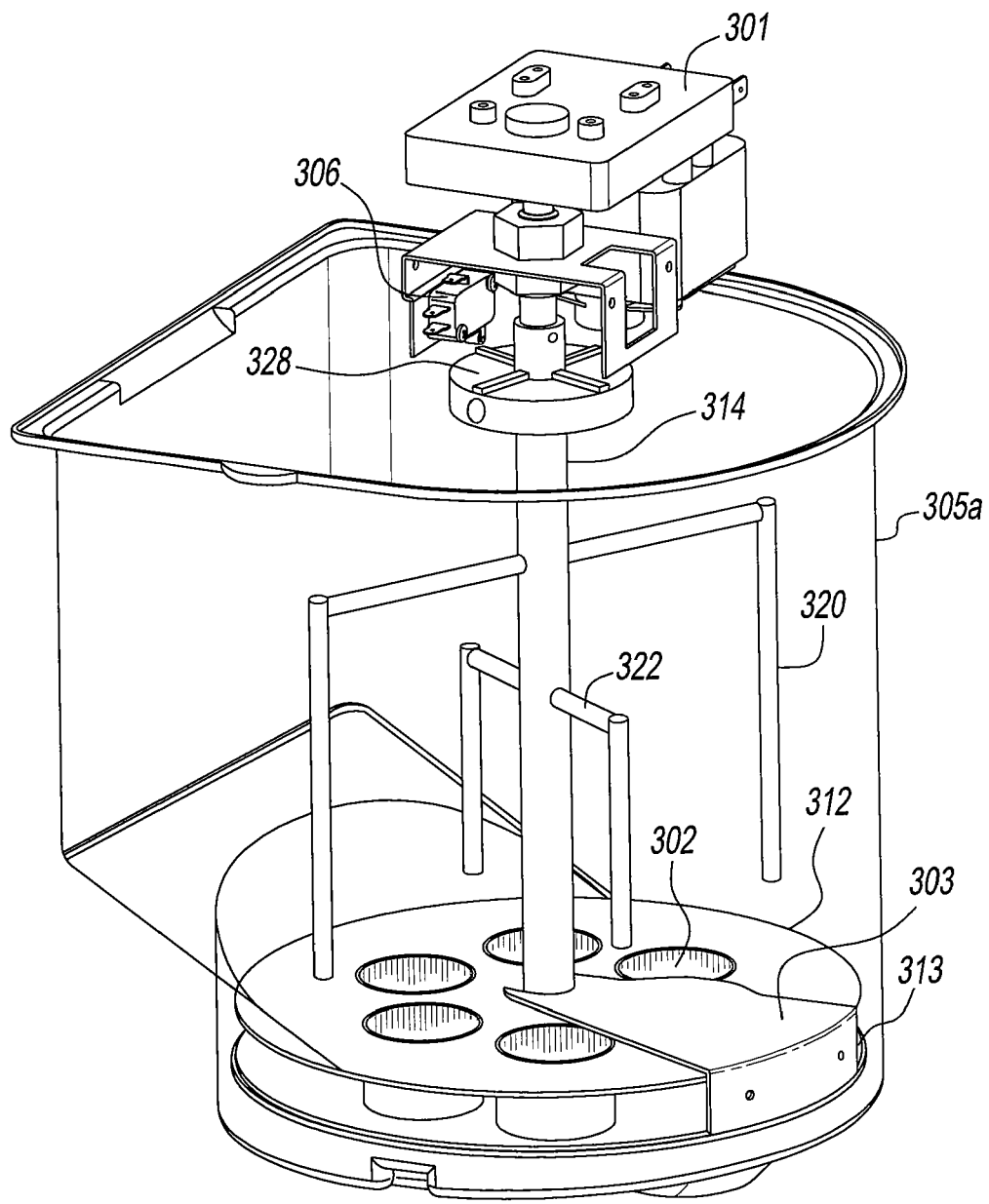
FIG. 19 is top left side perspective view of an ice bin, rake and portion control assembly according to the present disclosure.
Figure 20:
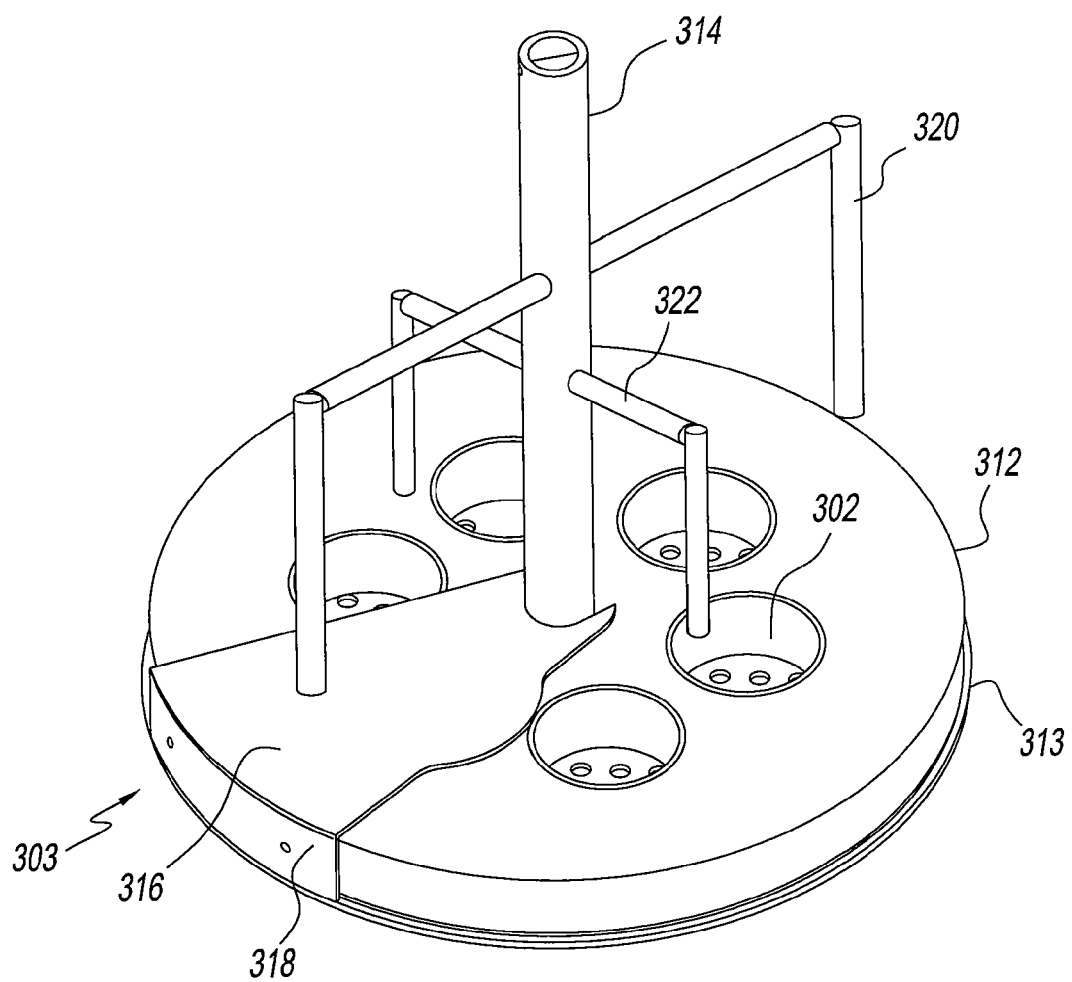
FIG. 20 is a top front perspective view of the rake and portion control assembly of FIG. 19.
Figure 21:
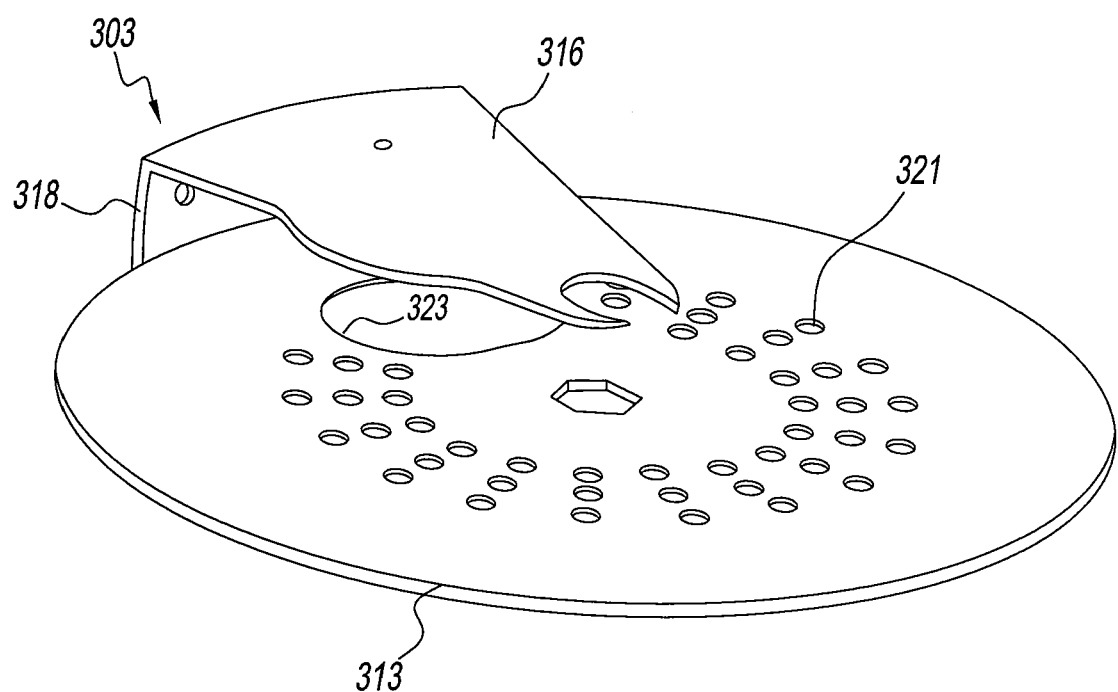
FIG. 21 is a top front perspective view of an ice leveler and bottom plate components of the portion control assembly of FIG. 20.
Figure 22:
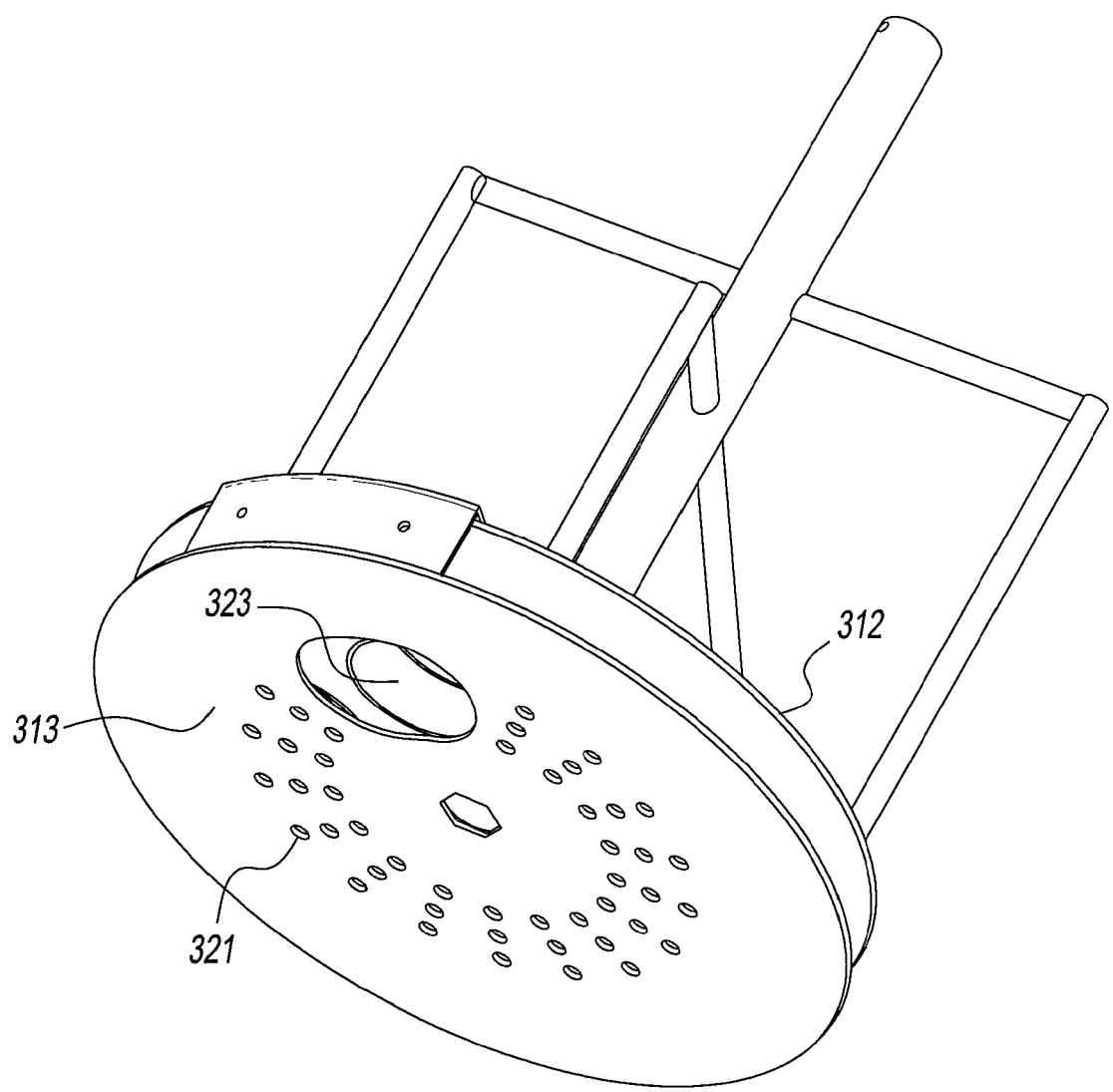
FIG. 22 is a bottom front perspective view of the rake and portion control assembly of FIG. 19.

As shown in FIG. 14, conduit 1119 may connect to a pump 1125. Pump 1125 selectively moves a portion of the ingredient from the container in holders 1115 through connection aperture 1117, to conduit 1119, to a line conduit 1130, and to dispenser nozzle 304 to dispense the ingredient out of assembly 100, for example, to cup 15. Pump 1125 may be an air powered pump that may include a diaphragm.

A portion of the ingredient, such as, for example, a fruit base, may be controlled by time. The pumps are calibrated initially to the ingredient that they are pumping. This allows for variations in product viscosity. It is possible to improve the dispense accuracy by incorporating a fluid and or refrigerated base temperature that would be used to provide a temperature compensation to the calibration. The controller measures the amount of product dispensed and subtracts it from the overall quantity of the bag. This provides a measurement and indicator of the remaining product in the bag.

As shown in FIGS. 18-22, ice maker, ice storage and portion control module 300 has one or more portion cups 302 that are fillable with ice. Portion cups 302 are formed by apertures 310 through a top plate 312. Plate 312 may have a circular shape. Each of apertures 310 has a sidewall that extends from top plate 312. Top plate 312 is positioned on a bottom plate 313 so that the sidewall of each aperture 310 abuts bottom plate 313 forming an interior volume for each of portion cups 302. Portion cups 302 have a predetermined size to hold a predetermined volume of ice. Portion cups 302 may be any size, such as, for example, about 1 ounce. Bottom plate 313 has a dispensing aperture 323 that is aligned with a nozzle 304. As shown in FIG. 7, dispenser nozzle 304 extends through a top side of container holder portion 20.

Top plate 312 is connected to a drive assembly 301 by a connector bar 314 to rotate portion cups 302. Drive assembly 301 may be, for example, a gear drive motor. Portion cups 302 that are filled with ice rotate with connector bar 314 on bottom plate 313 while bottom plate 313 remains stationary. Each of portion cups 302 remains filled with ice on bottom plate 313 until the portion cup passes over the dispenser aperture in bottom plate 313. The ice in the portion cup passes through the dispenser aperture in bottom plate 313 to dispenser nozzle 304 that dispenses the ice out of assembly 100, for example, into cup 15. Water is removed from cups 302 via perforated holes 321 disposed in bottom plate 313.

Connector bar 314 connects to drive assembly through a sensor 306. Connector bar 314 may include a cam or one or more protrusions 328 that fit within sensor 306 to form a cam follower and micro-switch for counting the number of portion cups 302 which dispense ice via dispensing aperture 323. Connector bar 314 may be connected to stirrer bars 320 and 322. Bars 320 and 322 are ice agitators that rotate through the ice in a storage bin 305a shown in FIG. 6 of ice dispenser 305. Their purpose is to keep the nugget ice from clumping together which would prevent the ice from filling into the ice cups.

The ice from ice dispenser 305 fills cups 302. Ice dispensing assembly 300 controls an amount of ice dispensed out of assembly 100 by controlling an amount of portion cups 302 that pass over a dispenser nozzle 304. Portion cups 302, for example, are round and hold a predetermined amount of ice. The number of portion cups 304 that pass over dispenser nozzle 304 determine the size of the drink being prepared. Portion cups 302 hold the predetermined amount of ice in the interior volume and as the size of the volume of ice increases or decreases a number of portion cups 302 that pass over dispenser nozzle 304 increases or decreases based on the predetermined amount of ice needed for each beverage. The cam follower and micro-switch are used to count a number of portion cups 302 that pass over dispenser nozzle 304. Counting a number of portion cups 302 that pass over dispenser nozzle 304 prevents positioning one of portion cups 302 partially over dispenser nozzle 304. A weight of the ice in storage bin 305a of ice dispenser 305 causes the ice cups to fill. As the assembly rotates the ice is leveled by a wedge 303 to provide accurate portioning. Portion control wedge 303 closes off a top of portion cups 302 as they pass towards a dispense chute above dispenser nozzle 304 after being filled with ice, thereby ensuring that a consistent portion of ice is present in each cup 302 before is releases its content into dispense chute 1126 disposed within nozzle 304. Wedge 303 may be a sheet metal wedge with a top portion 316, a side portion 318, and a bottom portion (not shown) that surround top plate 312 and bottom plate 313.

FIGS. 23-35 depict a, blender module 303 of assembly 100. It is contemplated by that assembly 100 may include, for example, from one blender module up to six or more blender modules. More than one blender module 303 allows for creation of a second beverage while mixing a first beverage, contributing to higher beverage output by assembly 100.

Figure 27:
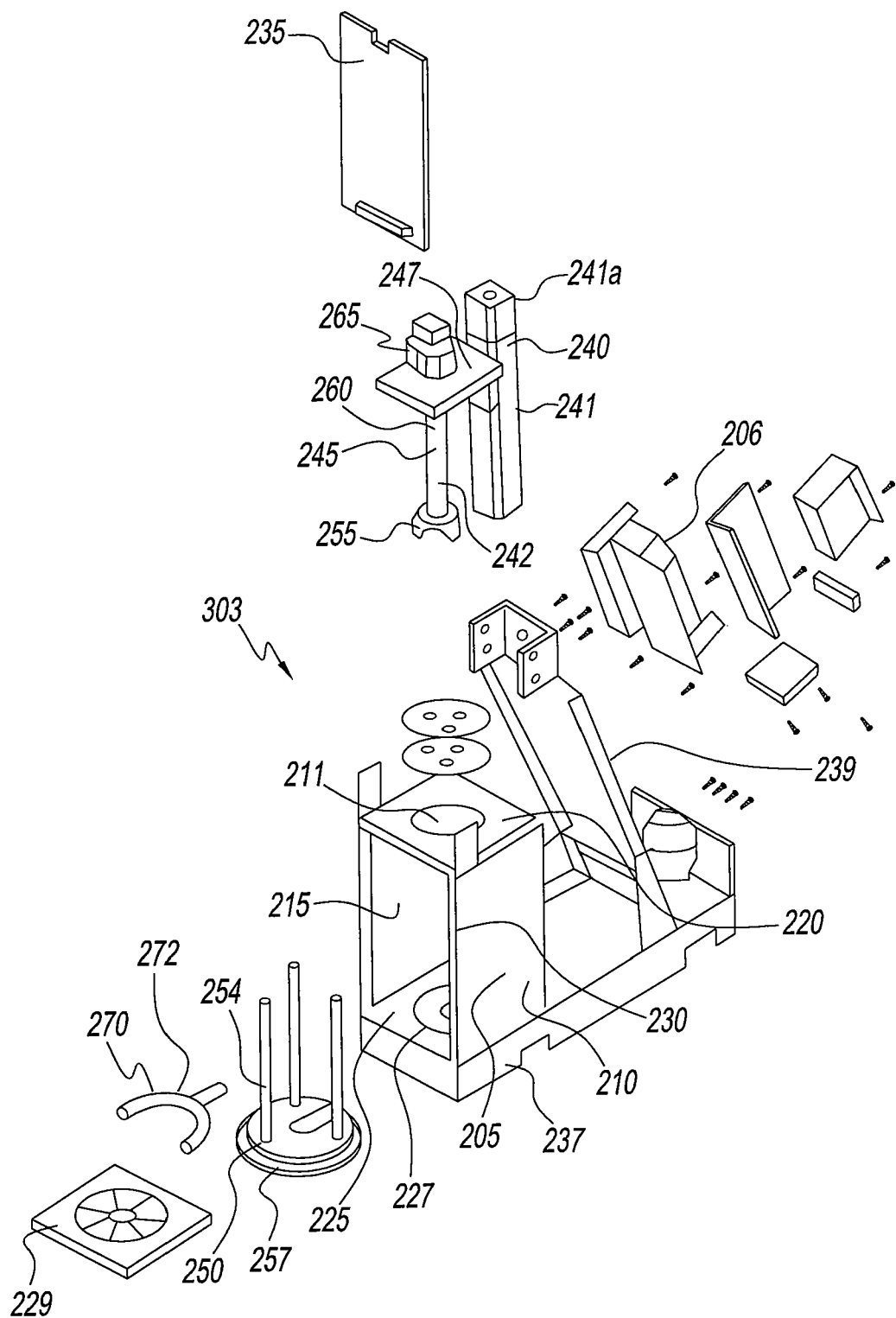
FIG. 27 is an exploded view of the blender module of FIG. 23.
Figure 28:
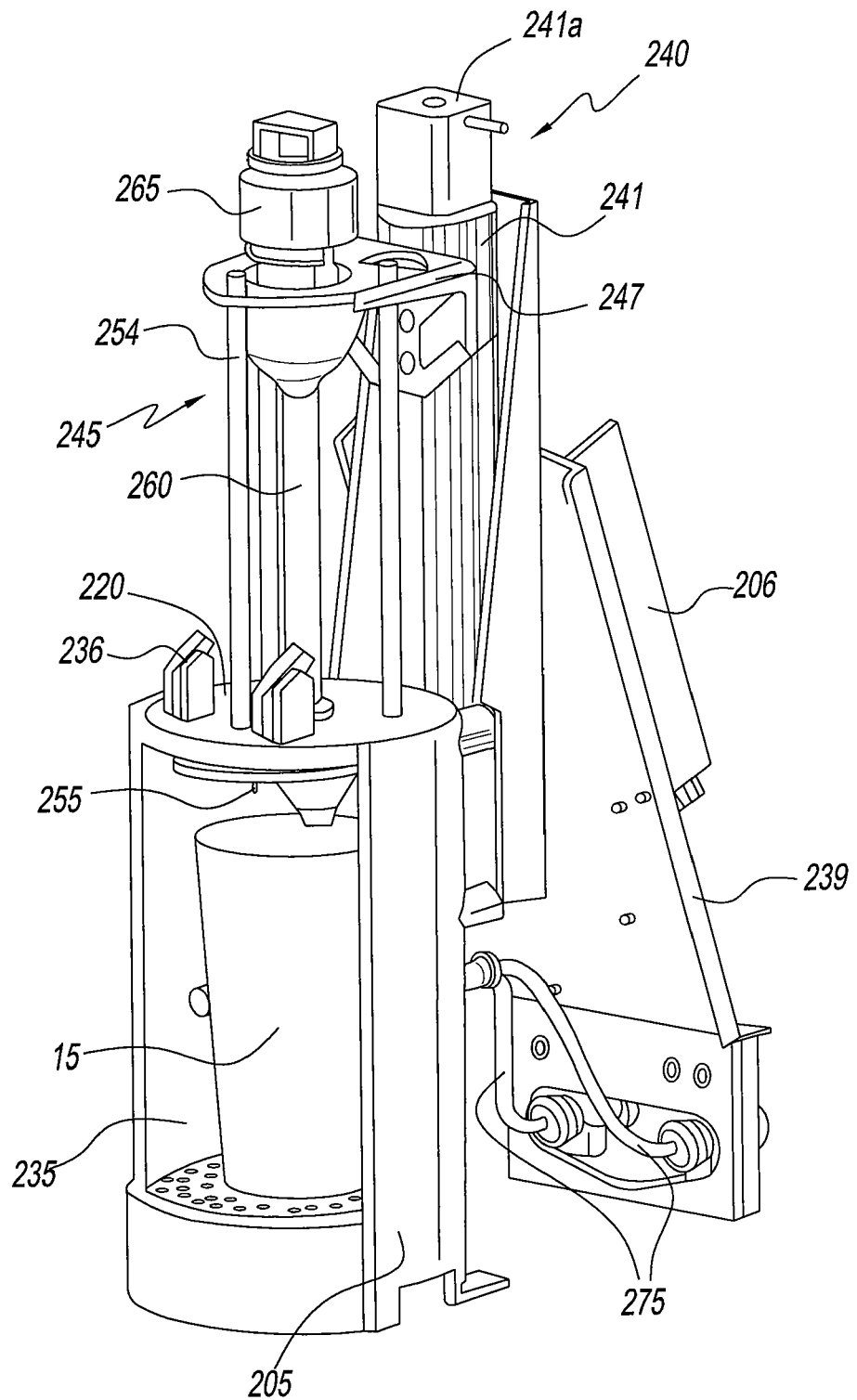
FIG. 28 is a front right side perspective view of the blender module according to the present disclosure with a serving cup disposed therein, the blending blade in the retracted position and the door in the closed position.
Figure 29:
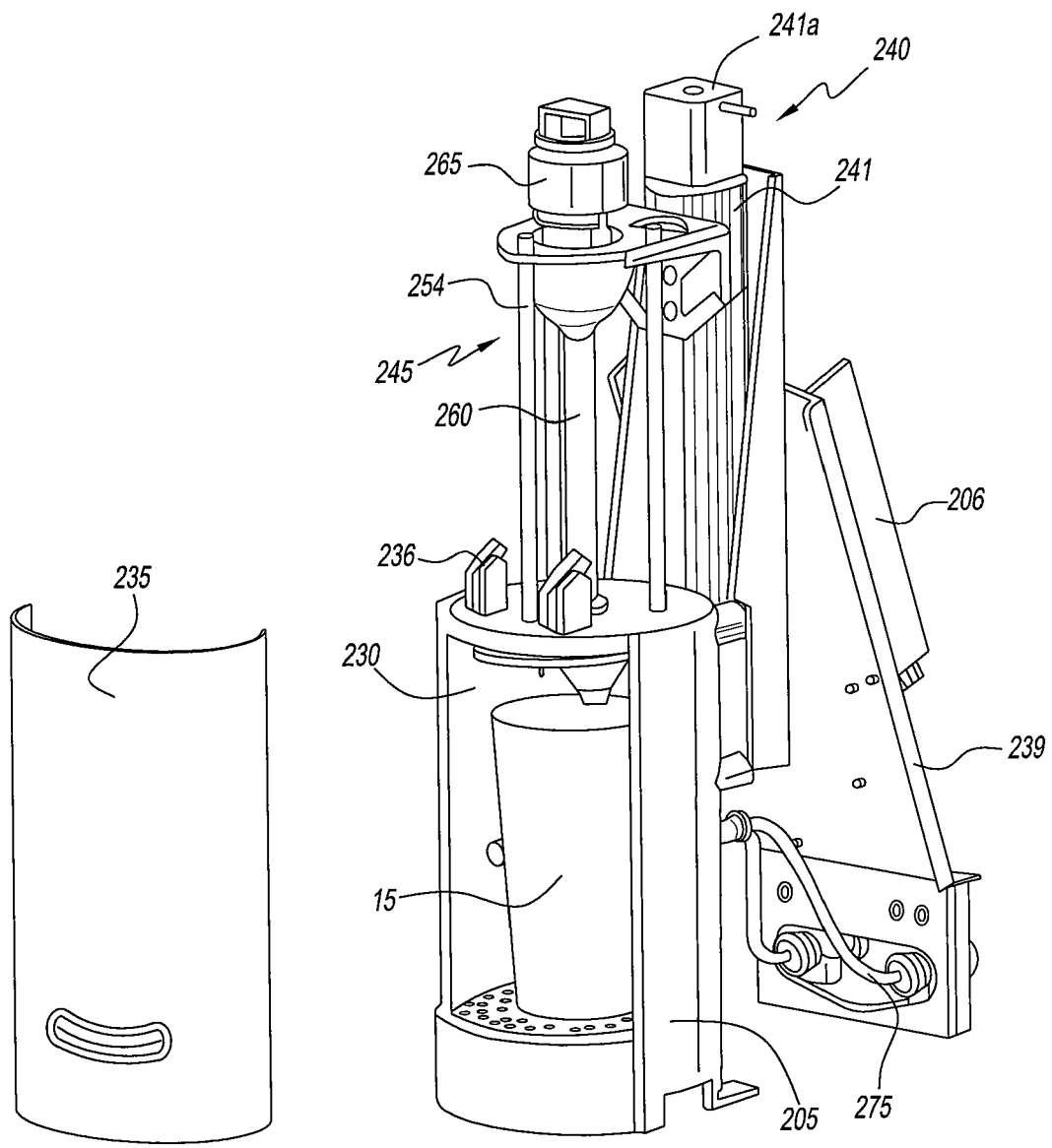
FIG. 29 is front right side perspective view of the blender module of FIG. 28, wherein the door has been removed from the module.

As shown in FIG. 27, blender module 303 has a mixer housing 205. Mixer housing 205 has a first side wall 210, a second side wall 215, a back wall 217, a top wall 220, and a bottom wall 225 forming an interior volume 230. Interior volume 230 may be enclosed by a door 235 that moves to a closed position when in blending, mixing or cleaning mode, as shown in FIGS. 7 and 28, and an open position uncovering interior volume 230 when blender module 303 is in a load or unload mode. Optionally, door 235 may be a material that transparent or translucent so that interior volume 230 is visible when door 235 is in the closed position. Door 235 is removable for maintenance as shown in FIG. 29. Bottom wall 225 may have a drain aperture 227. Drain aperture 227 may be covered by a filter cover 229.

Mixer housing 205 is optionally supported on a support structure 237. Support structure 237 has a motor support 239 that extends therefrom. Motor support 239 is connected to a motor 240. Motor 240 may be a stepper motor 241a with a linear slide 241 that is connected to motor support 239. Motor 240 is connected to a mixer 245. Motor 240 may be connected to mixer 245 by a bracket 247 that is moved by motor 240. Motor 240 moves spindle shaft 260 of mixer 245 in a reciprocal vertical movement through top wall 220 into or out of interior volume 230.

Figure 34:
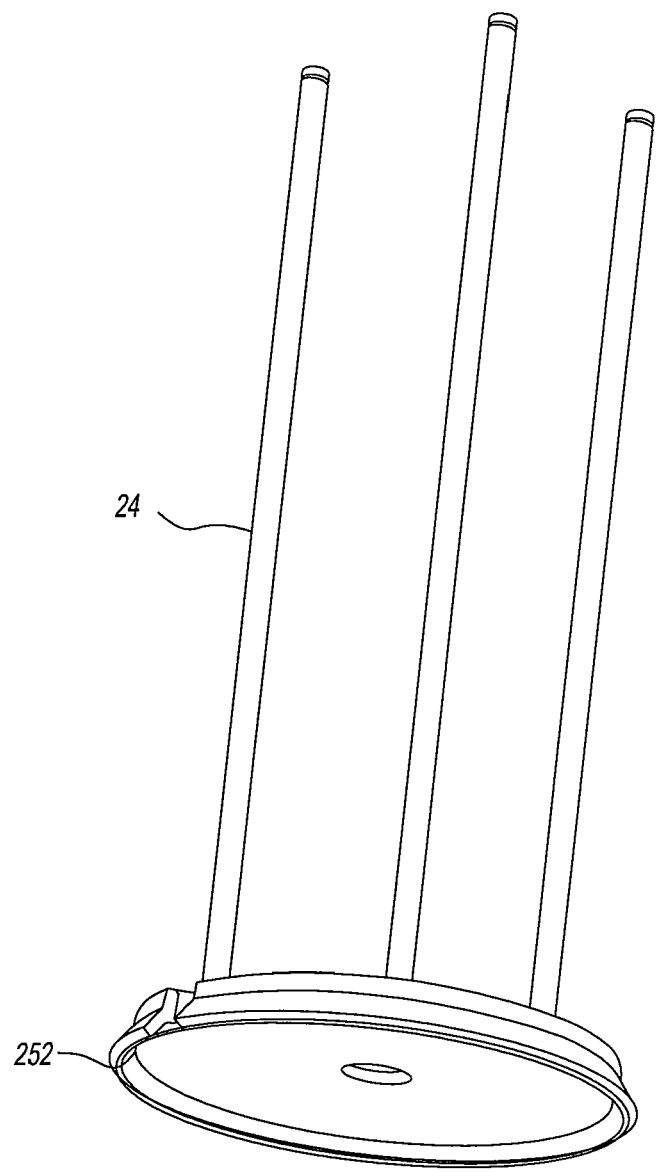
FIG. 34 is a bottom front perspective view of the serving cup lock and seal lid used in the blender module of FIG. 28.

Mixer 245 may be connected to a lid assembly 250, as shown in FIG. 34. Lid assembly 250 has a lid 252 and a plurality of alignment rods 254. Lid 252 is complementary in shape to a container, for example, a cup 15 having liquid therein placed within interior volume 230. Lid assembly 250 may move with mixer 245 into interior volume 230 into contact with cup 15. Lid assembly 250 remains in contact with cup 15, once lid assembly 250 is in contact with cup 15 while mixer 245 may move further into interior volume 230 along a length of connection rods 254. Spindle does not engage or spin until lid assembly 250 is in contact with cup 15 to prevent and spray or splatter. When mixer 245 is retracted toward top wall 220, mixer 245 moves along the length of alignment rods 254 until an end of alignment rods 254 is reached and then lid assembly 250 moves with mixer 245.

Mixer 245 has a spindle assembly 242 having a blender blade 255 that is wider than a spindle shaft 260. Blender blade 255 has projections that facilitate mixing of liquid within the cup 15. Spindle shaft 260 connects to a mixer motor 265 that spins blender blade 255 and spindle shaft 260.

Figure 33:
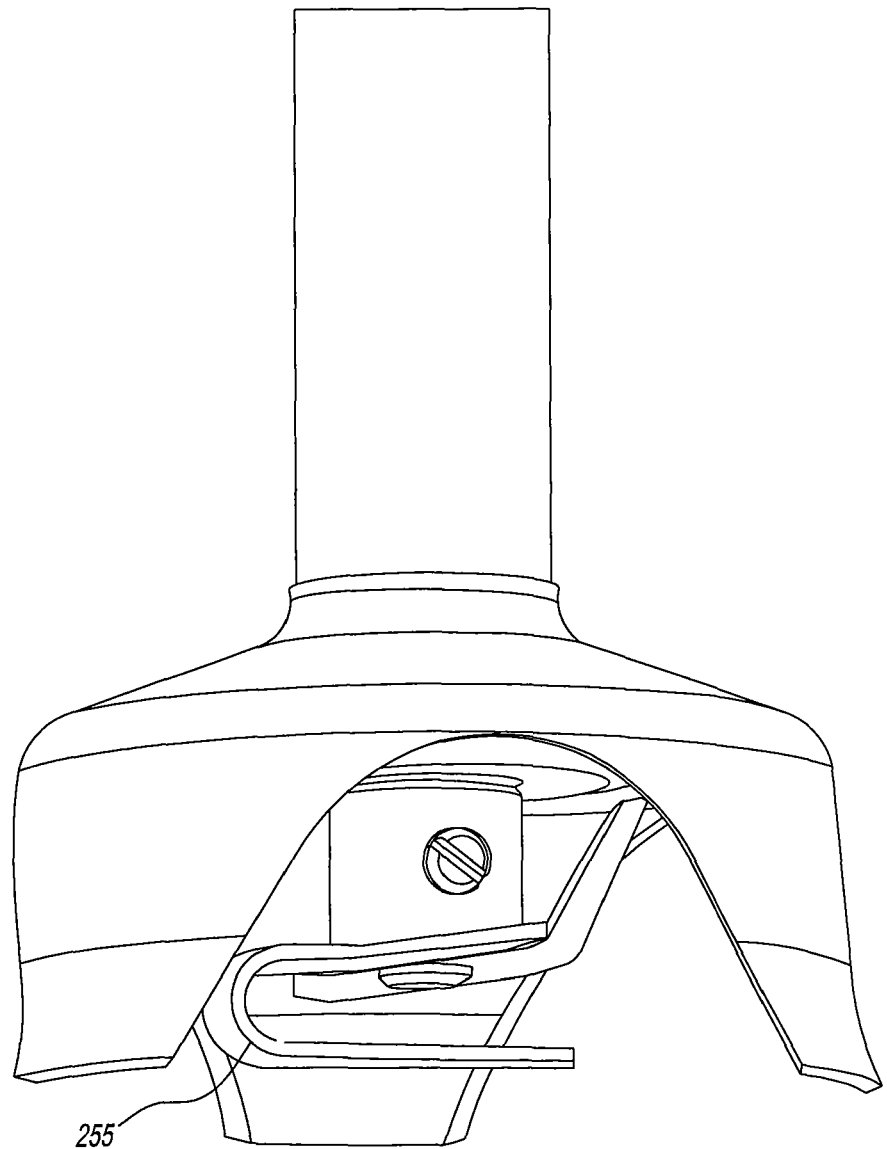
FIG. 33 is a bottom front perspective view of a blender blade according to the present disclosure.

Mixer 245 may be attached to linear slide 241 so that linear slide 241 moves mixer 245 vertically. A controller provides a mixing profile that insures proper mixing of the beverage. Linear slide 241 is driven by the stepper motor 241a that provides precise control of movement of linear slide 241. Controller may move blender blade 255 about 25% into the liquid within cup 15 before mixer 245 is energized to spin blender blade 255. By moving blender blade 255 about 25% into the liquid within cup 15 before mixer 245 is energized to spin blender blade 255, splatter from mixer 245 energizing before entering into the beverage is reduced and/or eliminated. After blender blade 255 is energized a customizable program indexes blender blade 255 down into cup 15. Blender blade 255 may be energized with a customizable program that indexes blender blade 255 down into cup 15 to insure that the nugget ice has a particle size that is reduced to beverage specifications defined by the user. Blender blade 255 dwells at a bottom of cup 215 for a predetermined amount of time. Blender blade 255 is raised and lowered for a predetermined period of time to provide complete blending of components of the beverage. After mixing is complete spindle assembly 242 returns to a home position, as shown in FIGS. 7 and 28. Stepper motor 240a and linear slide 240 may have a controller that counts a number of steps that motor travels allowing precise location of blender blade 255 leading to uniform beverages each time a beverage is dispensed and mixed from assembly 100. Preferably, blender blade 255 is an emulsifying blade as shown in FIG. 33.

Door 235 may have a safety switch 236. Microswitches are located on mixer housing 205. When door 235 is raised a microswitch 211, as shown in FIG. 27, is switched and blender blade 255 is disengaged from cup 15 retracting to it off position. Additionally, there is a tab 267, as shown in FIG. 32, that is a door interlock on mixer 245 that prevents door 235 from being opened when blender blade 255 is lowered.

Figure 32:
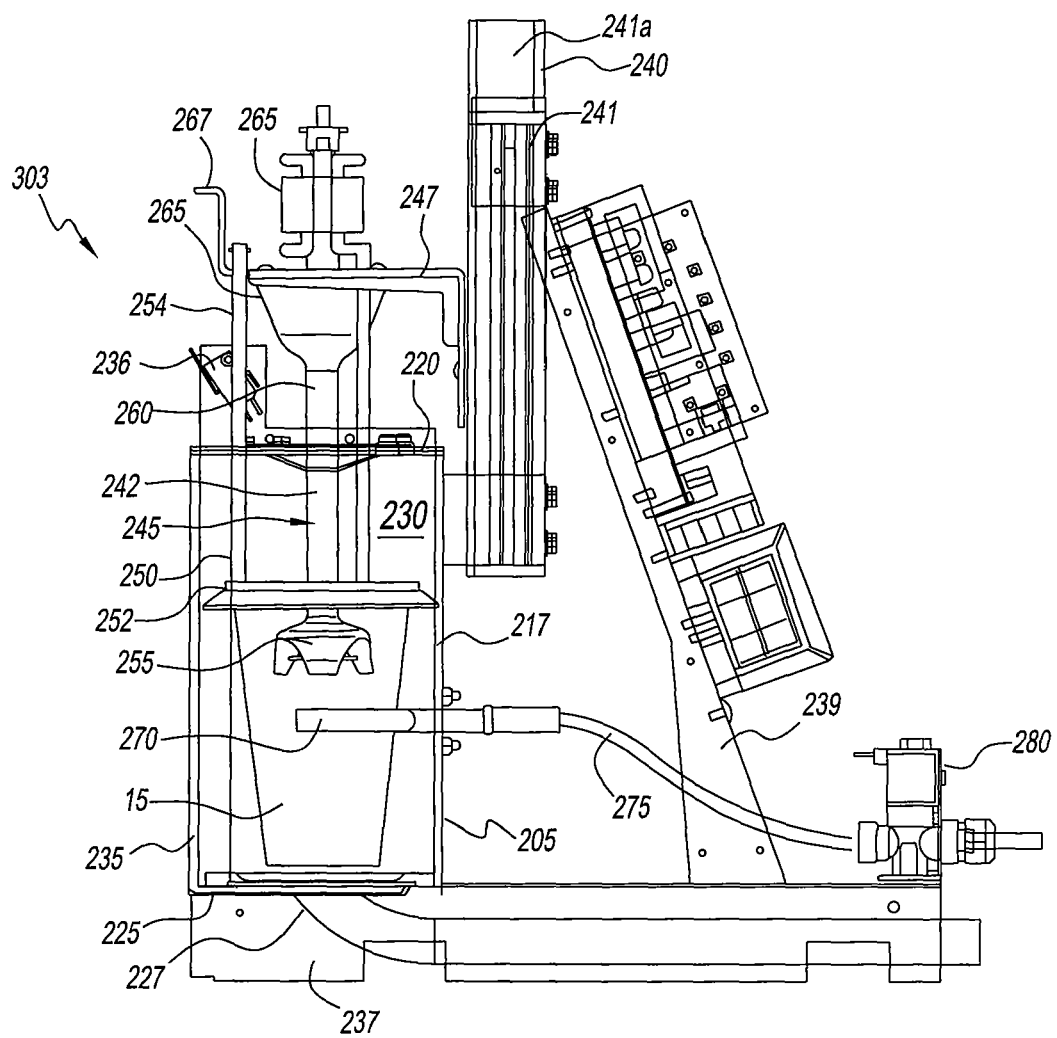
FIG. 32 is a right side view of the entire blender module according to FIG. 28 without the cleaner snorkel dispensing member.

Referring to FIG. 32, back wall 217 may have a container or cup holder or guide 270 connected thereto. Holder 270 may hold cup 15 in position during mixing by mixer 245. Holder 270 may be shaped complimentary to the shape of cup 15, for example, a U-shape.

Figure 30:
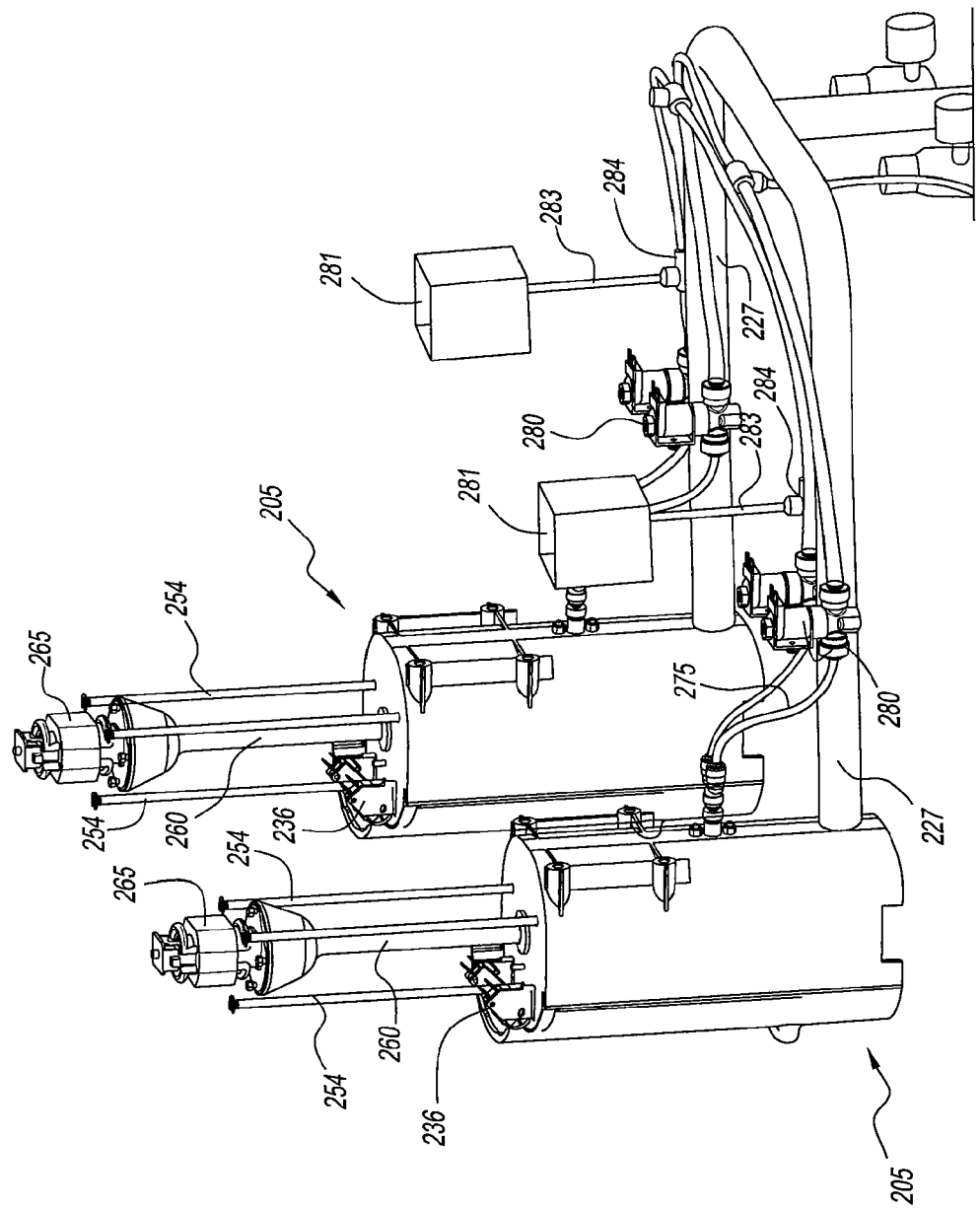
FIG. 30 is a back right side perspective view of a pair of blender modules according to another embodiment of the present disclosure with associated cleaner storage receptacles.
Figure 31:
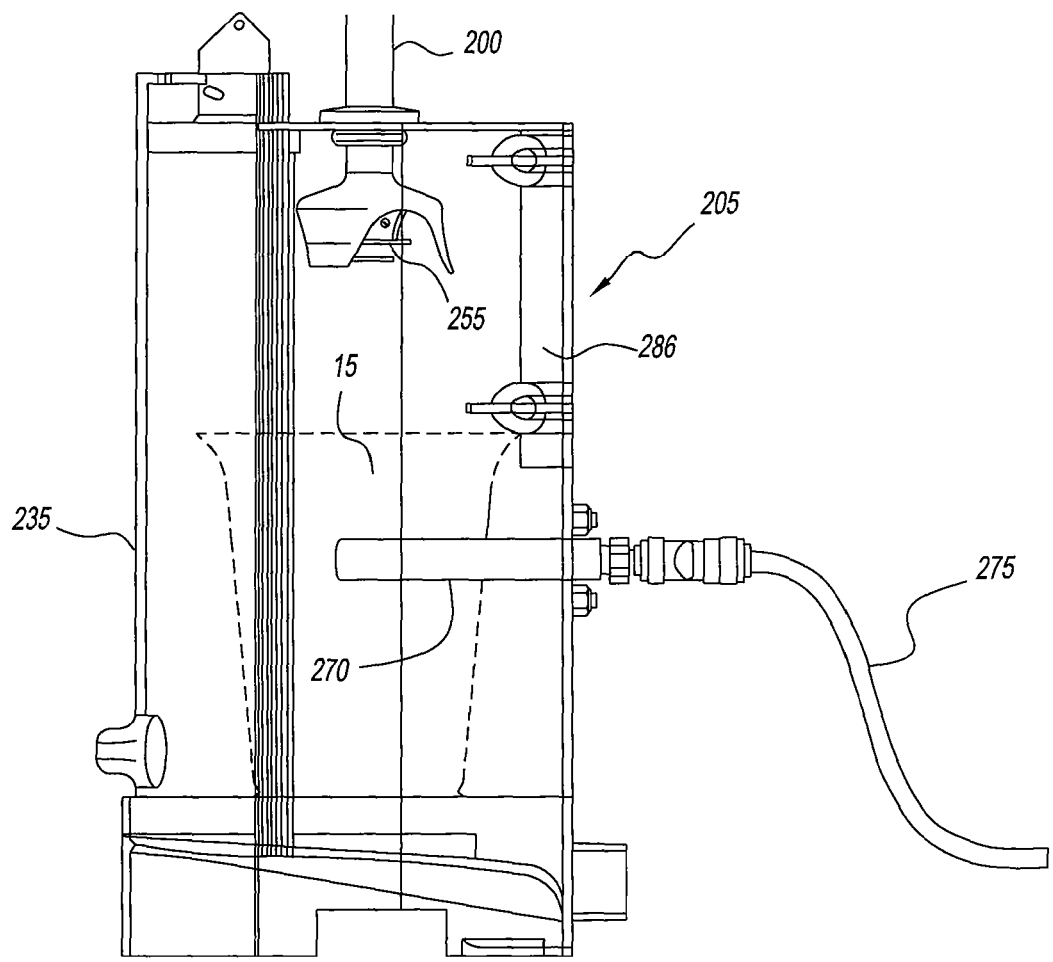
FIG. 31 is a right side view of the blender/mixer/cleaning housing unit according to FIG. 28 with a cleaner snorkel dispensing member.
Figure 35:
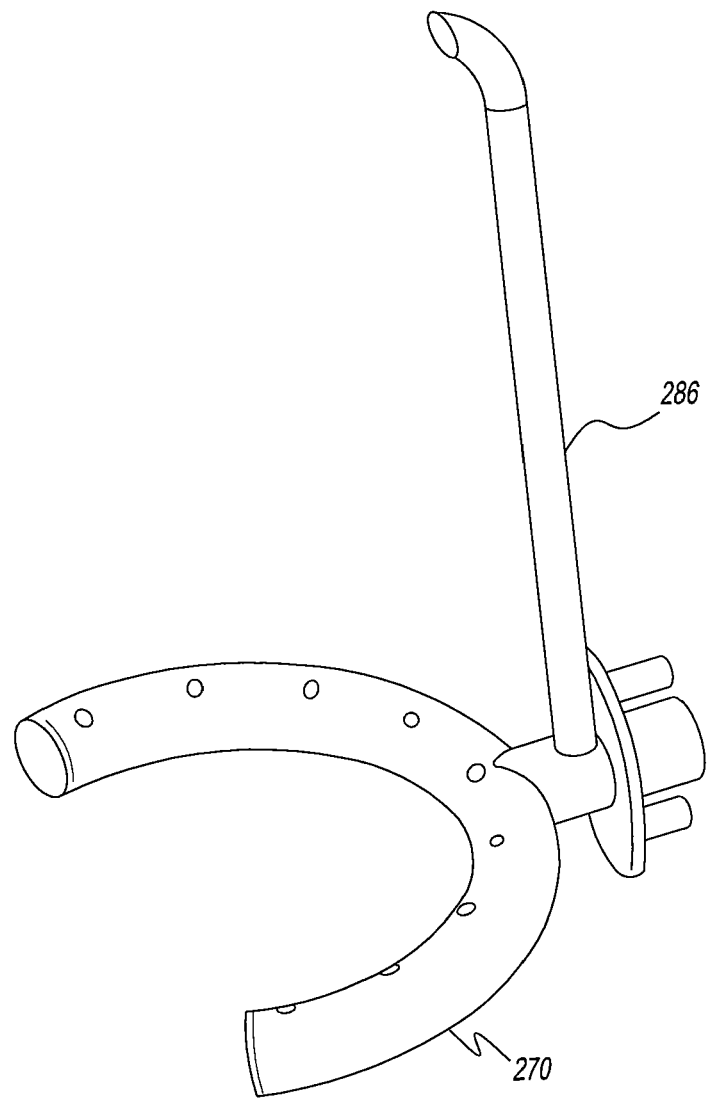
FIG. 35 is a top right side perspective view of the combination serving cup holder and cleaner dispensing unit with the cleaner snorkel dispensing member according to the present disclosure.

Holder 270 may also be connected to a liquid source (not shown) by tubing 275. Tubing 275 may be connected to the liquid source through a solenoid 280. The liquid is dispensed through one or more apertures 272 (shown in FIG. 27) in holder 270 into interior volume 230. The liquid may be water and/or a sanitizer. The water and/or sanitizer drains through drain aperture 227. FIG. 30 depicts a pair of sanitizer supply vessels 281 connected via tubes or conduits 283 to tubes 275, respectively. Preferably, a rinse or cleaning snorkel 286, as shown in FIGS. 31 and 35, is in fluid communication with holder 270 so that cleaning fluid may be dispensed substantially near the top of interior volume 230 of mixer housing 205.

After cup 15 is removed from interior volume 230, door 235 may be moved to a closed position so that interior volume 230 and/or mixer 245 may be rinsed/cleaned and/or sanitized. Water solenoid 280 and air solenoid 220a (FIG. 24) are energized. Mixer 245 is energized spinning blender blade 255 and lowered into interior volume 230 by stepper motor 241a and linear slide 241. Blender blade 255 is indexed up and down causing rinse liquid to spray entire interior volume 230 or mix compartment. Mixer 245 is de-energized stopping blender blade 255 from spinning and returns to the home location. Air continues and is used to help in removal of water residue. Another cup having another beverage therein may be mixed by mixer 245.

Mixer 245 and interior volume 230 may be rinsed with water only after mixing each beverage, mixer 245 and interior volume 230 may be rinsed with water and/or sanitized with a sanitizing liquid, such as, for example, soap or detergent, after mixing each beverage, or mixer 245 and interior volume 230 may be rinsed with water only after mixing each beverage and periodically mixer 245 and interior volume 230 are sanitized. A "Y" fitting 284 (see FIG. 30) may be placed into a water line 275 upstream of solenoid 280 to connect a source of sanitizing liquid 281. The sanitizing liquid may be metered into the water to sanitize mixer 245 and interior volume 230. The amount of sanitizing liquid may be controlled by a flow restriction (not shown) in tubing 283 of the source of sanitizing liquid 281 that connects to the "Y" fitting 284. A solenoid valve may be connected to tubing 283 of the source of sanitizing liquid 281 that connects to the "Y" fitting 284. The solenoid valve may be controlled so as to provide water only to rinse mixer 245 and interior volume 230 after mixing each beverage, and to periodically (e.g., daily) add the sanitizing liquid with the water to sanitize rinse mixer 245 and interior volume 230. Interior volume 230 and/or mixer 245 being rinsed and/or sanitized as described herein after each use prevents flavor transfer, eliminates germs, and eliminates the need for manual washing.

Figure 23:
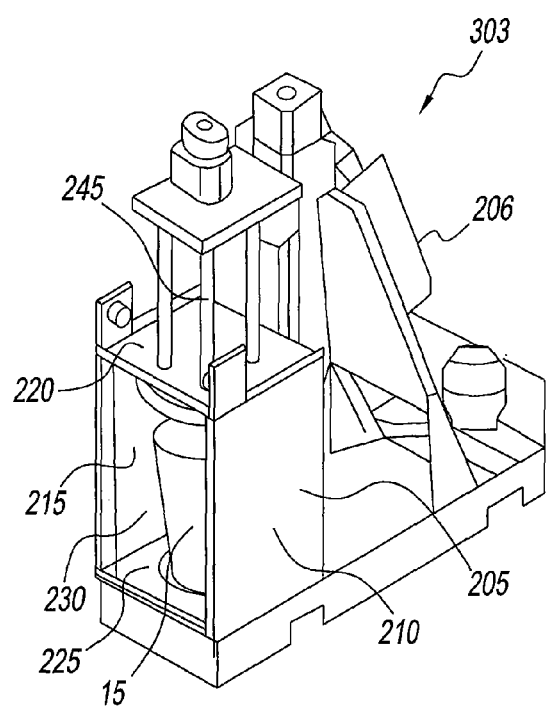
FIG. 23 is a top front right side perspective view of a blender module according to the present disclosure.
Figure 25:
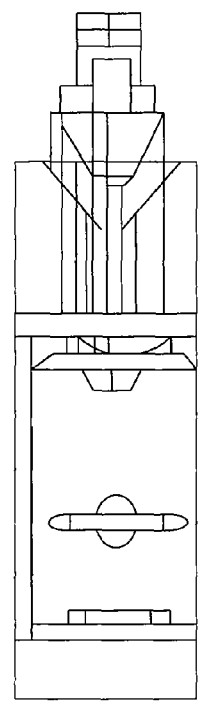
FIG. 25 is a front view of the blender module of FIG. 23.
Figure 24:
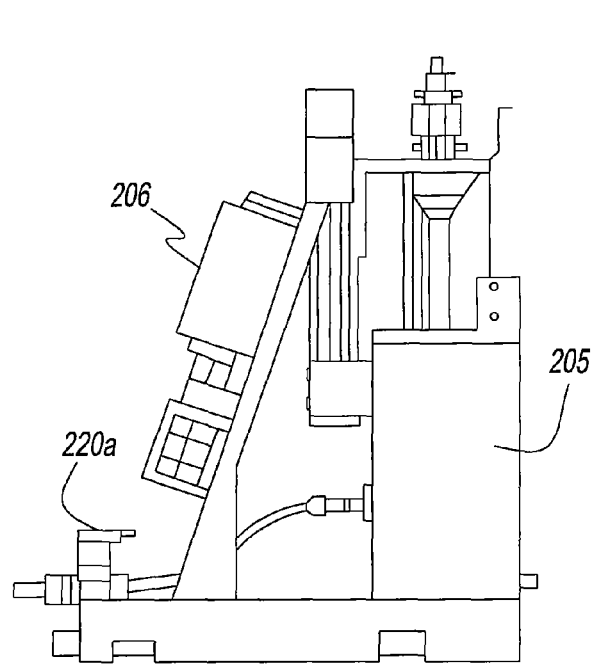
FIG. 24 is a side view of the blender module of FIG. 23.
Figure 26:
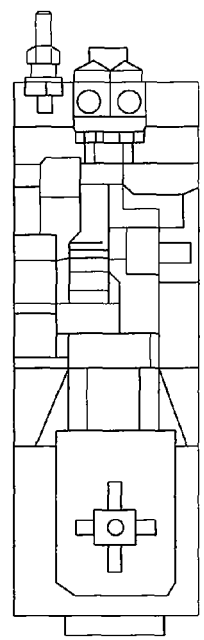
FIG. 26 is a top view of the blender module of FIG. 23.

Referring to FIGS. 23, 24 and 27, a controller 206, for example, a printed circuit board, controls blender module 303. When the beverage is dispensed into the cup and placed in mixer housing 205, a microswitch, such as microswitch 211, in door 235 is switched indicating the presence of the cup. The control board energizes stepper motor 241a on linear slide 241 or linear actuator and mixer 245 is lowered into the cup to a predetermined level (typically by counting a number of steps that stepper motor 240a is operated). When blender blade 255 reaches a pre-determined level the controller energizes blender blade 255 to rotate blender blade 255. Blender blade 255 dwells at the pre-determined level for a time and then linear slide is energized and is lowered further into the beverage to insure proper blending of the beverage. During the mixing blender blade 255 is raised and lowered in a sequence defined by the end user. Upon completion of the mixing process the controller disengages the stepper motor 241a and energizes linear slide 241 to remove blender blade 255 from the beverage. The beverage is removed from the mix chamber or interior volume 230 and trips the door microswitch. Upon the switching of the door microswitch the controller begins the rinse process.

Figure 36:
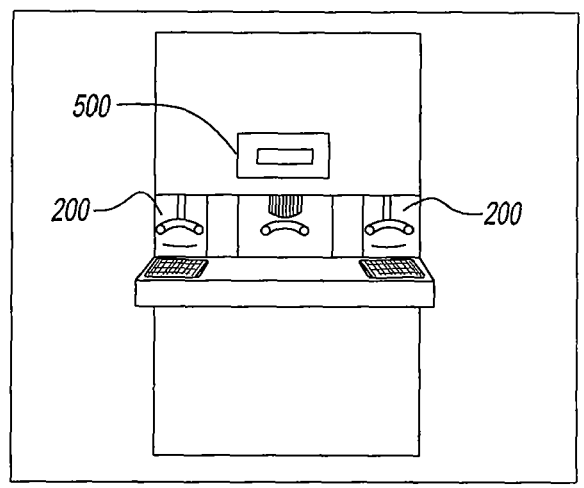
FIG. 36 is a front planar view of an exemplary embodiment of the system according to the present disclosure.
Figure 37:
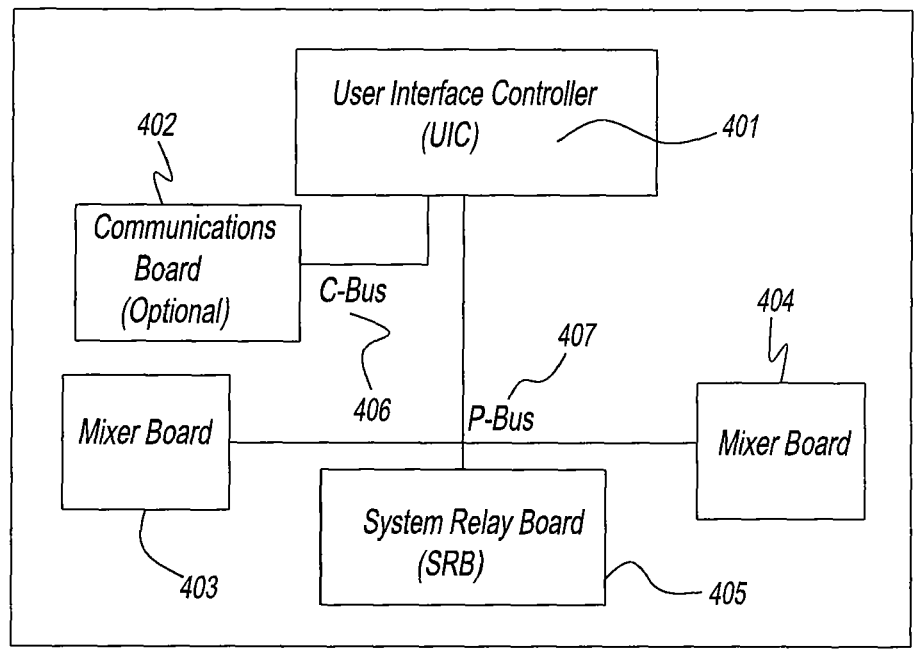
FIG. 37 is a block diagram of an exemplary embodiment of a system according to the present disclosure.

FIG. 37 shows a structure of control boards identifying that they are separate but interconnected. This provides flexibility in the design allowing additional boards to be added without re-designing the entire controller. FIG. 37 shows a user interface controller 401 that incorporates a button panel, such as a control panel 500 shown in FIG. 36, that an operator uses to select the drink as well as a computer that interconnects to other control boards. A communications board control board 402 provides a gateway for communication to various methods (web, modem, USB, and the like.). Mixer boards 403 and 404 are mixer control boards that contain logic controllers for the operation of mixer blender blade 255 and linear slides 240. Smart relay board 405 is a control board that houses switching relays for ice maker, ice storage and portion control module 300, flavor/ingredient dispensing module 1100, mixer spindle motor 240, linear slides 241, water solenoid 280, and air solenoid 220a. C-bus 406 is a communication interconnect. P-bus 407 is a wiring interconnect between boards.

Figure 38:
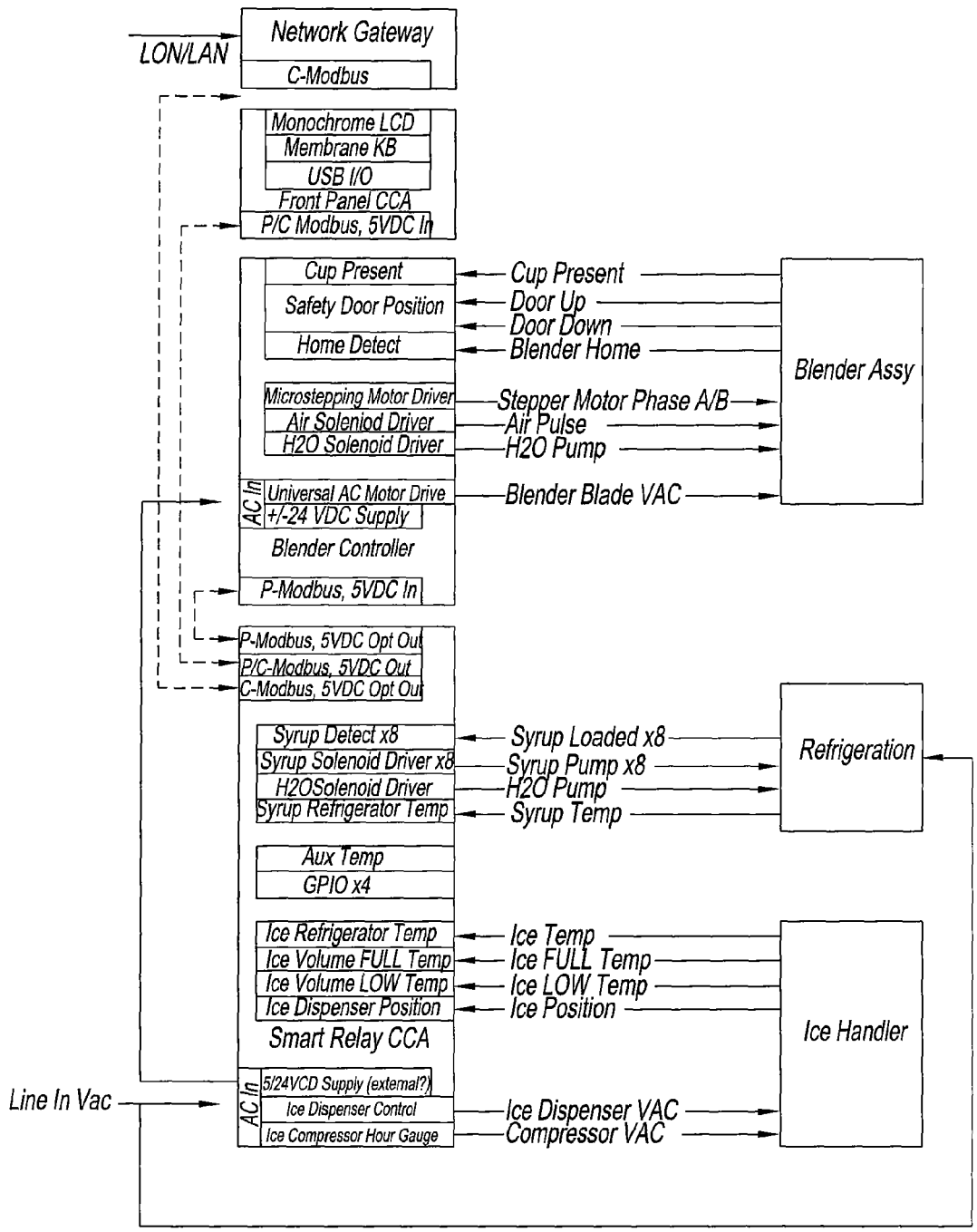
FIG. 38 is a block diagram of the network gateway, front panel display controller, blender/mixer and cleaner module controller and ice making and portion controller according to the present disclosure.
Figure 39:
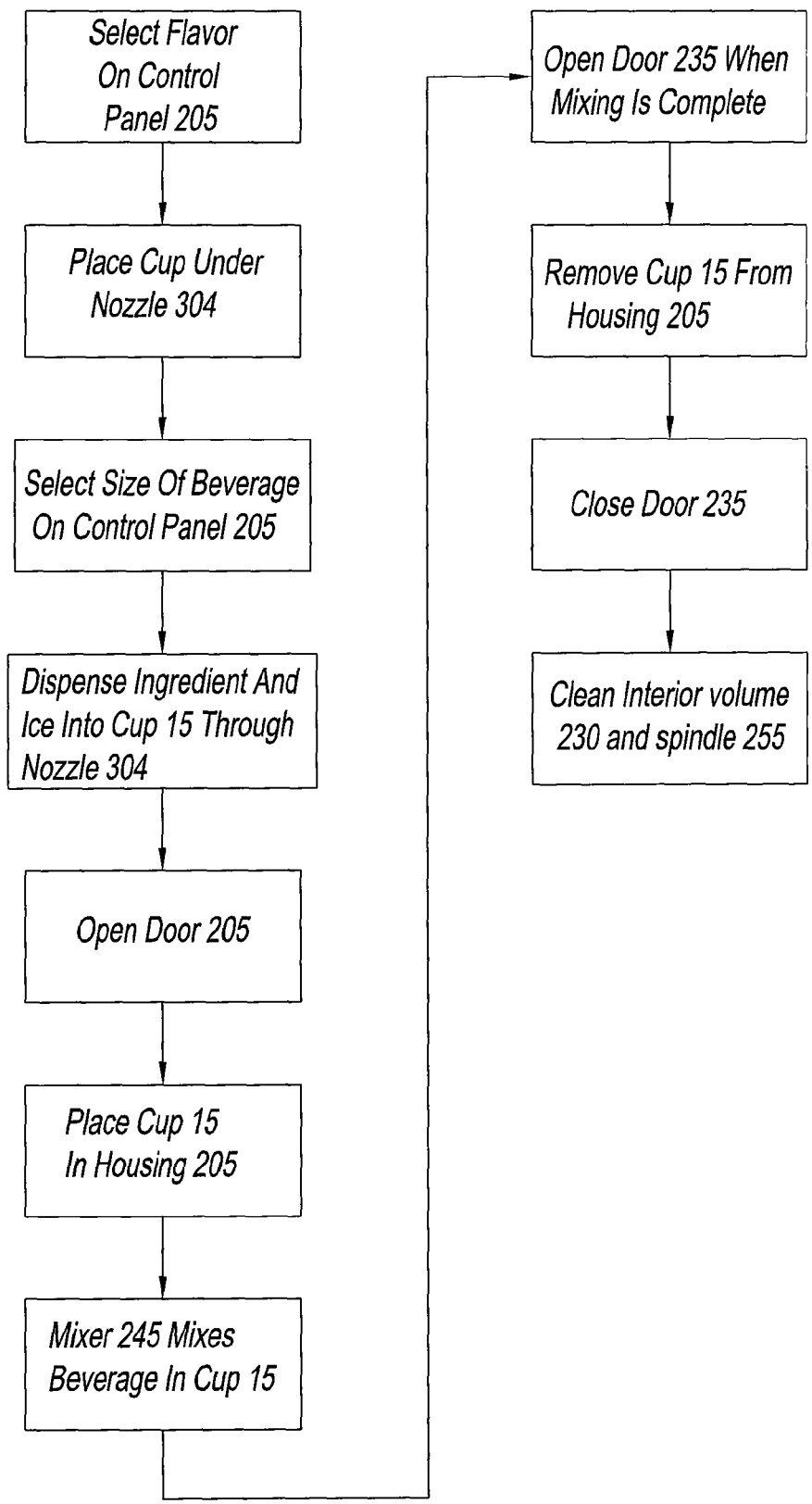
FIG. 39 is a process flow diagram of an exemplary embodiment of a method for dispensing, blending/mixing and cleaning according to the present disclosure.

FIG. 38 is block diagram showing inputs and outputs of assembly 100. Network Gate C modbus Communication module that allows communication via modem, internet, and the like. Front Panel CCA User interface that includes Monochrome LCD, Membrane KB and USB i/o. Blender controller receives sensor input from blender module 303 that determines the presence of cup 15, the home location of the spindle, and contains control logic for initiating mixer motor and linear drive motor, water and air solenoid signals. Blender controller has a controller for handling control of refrigeration system including syrup solenoid driver, water solenoid driver, syrup bag presence detection, and syrup temperature. Blender controller has additional capabilities of monitoring temperature of ice, level of ice in bin, low temperature alarm, and dispenser position.

Referring to FIG. 7, in use, cup 15 is placed on container holder portion 20 of assembly 100. Ice maker, ice storage and portion control module 300 dispenses ice to cup 15 through nozzle 304 and ingredient dispenser assembly 1100 dispenses an ingredient, such as, for example, a fruit base to cup 15 through nozzle 304. Cup 15 is then transferred into interior volume 230 of blender module 303. Door 235 is moved to the closed position and mixer 245 mixes the ice and fruit base. Upon completion of the mixing, door 235 is moved to the opened position and cup is removed and delivered to the consumer. Door 235 is then closed and interior volume 230 is rinsed and/or sanitized.

Each beverage may be mixed in a single serving cup 15 that is served directly to a consumer, allowing the entire beverage to be delivered to the consumer raising product yield and reducing wasted beverage, e.g., when blending the beverage in a blender pot. Having each beverage blended in its own cup improves flavor control and reduces allergy issues caused through cross-contamination.

It has been found by the present disclosure that assembly 100 allows operators to produce and dispense consistently prepared smoothie drinks in less than 40 seconds. Advantageously, assembly 100 generates ice through a fully integrated on-board ice system, ice maker, ice storage and portion control module 300. Ice maker, ice storage and portion control module 300 may, for example, have a 20-pound ice storage system that has the capability to create an additional 10 pounds of ice each hour, with a peak total of 270 pounds per day. Having ice generation on board removes the risk of injury through slips and falls, and it decreases the chance of bacterial contamination through mishandling. Additionally, the ice used in this machine is nugget-style ice, which is easier to fracture and blend down into the smoothie consistency. All of this allows for a perfectly blended beverage, for example, smoothie that fits within a normal QSR delivery time.

Each beverage, for example, smoothie is blended in its own cup, allowing the entire beverage or drink to be delivered to the customer and, in turn, raising product yield. Having each drink blended in its own cup improves flavor control and reduces allergy issues caused through cross-contamination. Assembly may, for example, consistently provide twenty 16-ounce drinks per hour and, at peak capabilities, forty-five 16-ounce drinks for one-hour bursts. Money is also saved through the elimination of small wares or blender pots that were purchased and stored by restaurant owners in the past.

Advantageously, spindle assembly 242 goes through a rinse and sanitation process after each use to prevent flavor transfer and eliminate the need for manual dishwashing. Additionally, for example, two mixer modules included in assembly 100 to allow for the creation of a second drink while mixing the first, contributing to higher drink output and, consequently, to the bottom line of the operation. To overcome this challenge, nugget-style ice may be used with assembly 100. Nugget ice is softer than the more commonly known cube ice, and it is formed in a freeze barrel with an internal auger that continually scrapes the freeze surface. This flake-style ice is moved to the top of the freeze barrel by the ice auger, where it is extruded into the ice nugget. The resulting smaller ice greatly reduces the amount of blending required to create the drink. Additionally, the noise generated from the blending process is reduced by using this smaller nugget ice. This becomes especially important when the equipment is placed in the proximity of the front counter or near a drive-through window.

The blender pots in current smoothie machines are designed to fully mix the drink and grind the ice to a grain size that meets customer taste profiles. When mixing in a cup, there is no geometry to assist the mixing and grinding of the ice. To achieve the proper drink consistency, linear slide 241 moves blender blade 255 up and down in cup 15. This process simulates how a drink is made using a handheld stick mixer. Blender blade 255 lowers into the drink (about 25%), at which point blender blade 255 is energized. Once engaged, the spindle is lowered fully into the cup and allowed to dwell. This process grinds the majority of the ice, but at that point, the drink is not fully developed. The spindle is then raised and lowered following a profile created for the specific drink, taking into account the viscosity of the fluids, ice-to-fluid ratio, and the drink cup size.

It has been found by the present inventors that size limitations (footprint) may be achieved by a configuration of the components of assembly 100. While a traditional machine creates drinks in a blender pot to mix more than one flavor, assembly 100 dispenses and mixes each drink in a serving cup, and may have dual spindles to maintain throughput and delivery times. Assembly 100 may address size requirements by vertical placement of the components.

Assembly 100 may maintain the accuracy of mixer 245—used to create drink consistency—by stepper drive motors 241a control the linear slides 241. Stepper motors 241a provide the ability to create different blending profiles for the various types of drinks (coffee-based, fruit-based, fruit-plus-yogurt drinks). Counting the number of steps that stepper motor 241a travels allows precisely locating blender blade 255 every time a drink is blended.

Ice maker, ice storage and portion control module 300 maintains ice dispense accuracy. The ice dispense was then divided into portion cups. As the drink size changes, the number of individual dispense cups dropping ice into the beverage increases or decreases to match. To measure the number of ice dispenses, micro switches (located outside of the ice bin) were incorporated to count the number of cups. This method provides consistent ice delivery regardless of the level of ice in the bin.

Blender pots that are currently used are made of hard plastic, with the ability to withstand the forces used to crush ice into an acceptable consistency for a smoothie drink. Grinding the cube-style ice, most commonly found in QSRs, would put too much stress on the machine's blender and the customer's cup.

Definitions, acronyms, and abbreviations may include:

| Abbreviation | Definition |
| --- | --- |
| UIC | User Interface Controller |
| SRB | System Relay Board |
| P-BUS | Peripheral bus |
| C-Bus | Communication Bus |
| CCA | Circuit Card Assembly |
| SFR | System Functional Requirements |

Referring to FIGS. 36 and 37, assembly 100 may be a "Smoothie maker system" that consists of an integrated ingredient dispensing unit, up to 4 mixing units (expandable from 2 in normal configuration), and a control panel for user operation.

As depicted in FIG. 38, the system is designed using a Smart Relay CCA, two mixer CCAs (normal configuration), an optional communications board for external communications, and a user interface controller board. All of the subsystem boards communicate with each other using a MODBUS protocol and RS-485 physical link.

Smart Relay CCA is responsible for dispensing control, monitoring and safety of the system ice-maker, and flavoring assembly/subsystem. Also the Smart Relay CCA provides the power and Modbus hub for the Smoothie System control electronics.

The Blender Controller CCA is responsible for position, speed, cleaning and safety control of the system blender assembly/subsystem, such as blender module 303. It controls the blender blade, water and air pumps and senses cup present and door switch.

The user interface controller board can consist of a monochrome LCD display, membrane keypad for control and configuration. A more common configuration is a color LCD display with touch screen capability.

Referring now to FIGS. 36-42b, functional requirements of an exemplary embodiment of the present disclosure are shown and described.

The system shall have method for configuration for the following:
1. Mixing profiles
2. Particular fluids selections (x out of 254 displayed)

The system can be updated by a USB flashdrive or via a communication port that will allow for other media.

The User Interface shall have a degrees F/C selection for temperature display in the setup mode.

Dispenser Flavor(s)

The minimum Number of Flavors per Serving shall be 1, unless dispensing ice only A flavor selection status shall be toggled by pressing the button corresponding to the flavor in question or de-selected by using the canceling button Upon reaching the maximum Number of Flavors per Serving, the system shall not allow selection of any additional flavors; additional flavors are not allowed The user shall be able to change the flavor selection(s) by pressing the CANCEL button and selecting desired flavor(s)

The user shall be able to change the flavor selection(s) by first de-selecting a (the) flavor(s), then selecting the desired flavor(s)

Unit shall monitor use cycles of flavors and provide a user indication on the display of low level for each flavor for early warning of flavor out.

Dispenser Additive(s)

The additives consist of a selection of 2 types of fresh fruit and yogurt. Only the yogurt is dispensed automatically; instead of dispensed, the fresh fruit has to be manually added. The fresh-fruit selections are used to compute the amounts that are dispensed. Fruit is placed in cup prior to receiving the ice and fruit.

The Minimum Number Of Selected Additives shall be 0

Refrigerated Base (Flavor Storage)

The Fruit flavors and yogurt shall be stored in a refrigerated base designed to maintain a product temperature between 34° F.-38° F.

The base design will be such that flavors can be stored in "bag-in-box" packaging The base will house flavor pumps (up to 8) and all associated delivery tubing, and air solenoid switches The base will be mounted on castors to allow access to rear of unit for cleaning The base will be designed to meet NSF and UL requirements.

The base will provide a method air delivery and return to dispenser section to maintain product temperature to the dispense nozzle (per NSF)

Ice Making

Smoothie machine will have on-board ice making capabilities

The device shall have ice machine capability to store ice in addition to ice making capabilities The ice machine shall generate hard nugget ice or a method of reducing cube ice to a smaller particle size Ice Dispensing Ice is normally dispensed during the smoothie making process but could also be dispensed exclusively.

The system shall allow dispensing of ice in an exclusive manner (i.e. without flavors or water)

Ice shall be dispensed in a portion amount that allows scaling for various drink cup sizes Upon selection of the ice-only button, the system shall proceed to cup size selection The ice-only button shall only be available when no flavors are selected. Conversely, upon selection of a flavor the ice-only button shall be disabled There shall be a Service maintenance mode to allow cleaning on the dispenser fluid lines Cup Size Selection The system can allow cup size selections of small, medium large, and extra large, with a provision for additional cup sizes determined by customer Provisions will be made for cup storage on the unit Cup size selection can trigger the dispensing process Dispensing The dispensing process shall use the cup size as a scaling factor to compute ingredient amounts; water, ice and selected flavors/additives The ingredients and quantities dispensed can be used to determine the mixing profile Fruit flavor ingredients can be delivered using air driven condiment pumps Condiment pumps can be located in the refrigerated space Condiment pumps shall be removable for easy access for service Condiment pumps can be energized using solenoid valves mounted in the air flow to the pumps The amounts of ingredients used for each smoothie including flavored fluids, water, ice and additives shall be determined by the drink recipe shall reside in the controller.

Mixing

The mixing process includes the actual mixing of the ingredients in a cup and a subsequent cleaning cycle to ensure that the blender's blades are clean for the next mixing cycle.

The mixing operation shall be asynchronous to the dispensing operation]

The mixing operation can be determined by the current mixing profile.

The mixing operation shall consist of a minimum of 2 steps, blending & cleaning

The mixer shall be designed as a module that attaches to the ice machine and refrigerated base The mixer module shall consist of a mixer spindle, blade, a linear slide, cup holder and water nozzles The mixer module door shall contain sensors and or switches to locate the door position and to provide a lockout Mixer Sequence of Operation When the drink has been dispensed it is placed into the cup holder of the mixer module and the module door is closed.

When the closure of the door is an indication for the mixer to begin the mixing process.

The mixer spindle shall index (via linear slide) down into the drink cup X inches from home position, where X depends on the height of the drink cup selected The mixer blade shall be energized just prior to contacting the ingredients in the cup The spindle can dwell at the initial engagement point for a period of X seconds, determined by blender profile.

The spindle can 1 then index into the drink to a depth of cup X, determined by the blender profile.

The spindle can dwell in this location for a period of X seconds, determined by blender profile.

The spindle can then move up to another location and continue to mix for a predetermined period of time (e.g., 3 seconds), determined by the blender profile.

Upon completion the mixer blade shall change to a pre-determined speed and continue to rotate until it breaks contact with the fluid where it will be de-energized and returned to its' home location.

The door is then opened and the drink is then removed and served

Mixer Cleaning Process

After the last mixer sequence the module shall begin the cleaning process when the mixer door is closed.

The cleaning process shall start with the spindle being lowered into the mixing cavity and the spindle blade energized.

A water solenoid shall be energized for a user defined amount of time (e.g., 3 seconds and begin to spray rinse the spindle and cavity after the spindle blade is energized during a mixer cleaning cycle.

An air solenoid connected to the water line can be energized to provide a high pressure blast of water during the mixer cleaning cycle as well as providing an air blast to assist in removing residual water from the blender module.

The module can be designed to operate with sanitizing agents in addition to water.

The unit can be able to detect run out of sanitizer fluid.

When the mixer cleaning cycle has ended, the solenoids are de-energized and rinse water is drained from the blender module.]

Mixing Profile

A mixing profile determines the steps to be performed during the mixing operation. Each step in the mixing profile specifies spindle's speed and time (how fast for how long) as well as position (with dwell time).

A normal and Additive included mixing profile can be available for each cup size.

When a—additive is selected, the mixer shall use the Additive mixing profile

The mixing profiles shall be customer configurable.

User Interface Controller (UIC)

The UIC shall support handling of USB storage devices.

The UIC shall be capable of connecting to the C-Bus

The UIC can provide 1-press on-the-fly language switch

The UIC can be the P-Bus master

System Relay Board

The relay board can be responsible for determining the system configuration including fluids loaded and number of blenders and relaying to the Blender control board Blender Control Board The peripheral bus or P-Bus shall connect the User Interface Controller to the system's peripherals (the System Relay Board and the Mixer Control Boards)

The peripheral The P-Bus shall use RS-485.

The P-Bus can use ModBus RTU.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. An integrated beverage blending system comprising:
   at least one system controller;
   an ice portioning module;
   an ingredient module;
   a dispensing apparatus in communication with said ice portioning module and/or said ingredient module;
   a blender module with an integrated cleaning apparatus, wherein said ice portioning module comprises: an ice bin for storing ice; a rotatable base of said ice bin having at least one portion control compartment; at least one leveling blade that ensures consistent volume of said ice in each portion control compartment; a dispensing port in communication between a selected portion control compartment and said dispensing apparatus, thereby allowing ice in said selected portion control compartment to be dispensed into said dispensing apparatus; and a sensor in communication with said controller which determines the amount of ice which is dispensed into said dispensing apparatus.

2. The system according to claim 1, wherein an agitator is used to prevent ice in said ice bin from congealing which would prevent ice from entering into said rotatable base.

3. The system according to claim 1, wherein said rotatable base is formed by a pair of oppositely disposed first and second plates, wherein one or more compartments are formed by at least one sidewall disposed between said first and second plates, wherein said first plate comprises an opening associated with each said compartment to allow said ice to move from said bin into each said compartment, and wherein said second plate includes drainage holes which allow for water to drain from said ice disposed within each said compartment.

4. The system according to claim 1, wherein said rotatable base is formed by a plate and at least one compartment wherein the compartment is formed by at least one sidewall attached to said plate, wherein said plate comprises an opening associated with said compartment to allow said ice to move from said bin into said compartment, and wherein said compartment includes drainage holes which allow for water to drain from said ice disposed within said compartment.

5. The system according to claim 3, wherein said ice portioning module further comprises a rotatable shaft connected to a motor which rotates said rotatable base, and said at least one leveling blade to ensure consistent portion of ice, wherein said first plate and said sidewall rotate together with said rotatable shaft, while said second plate remains stationary and wherein said dispensing port is disposed within said second plate to allow the contents of each compartment to be removed therefrom when said compartment is aligned with said dispensing port.

6. The system according to claim 4, wherein said ice portion control module further comprises a rotatable shaft connected to a motor which rotates said rotatable base, and said at least one leveling blade to ensure consistent portion of ice, wherein said plate and said sidewall rotate together with said rotatable shaft and wherein said dispensing port is disposed within said plate to allow the contents of each compartment to be removed therefrom when said compartment is aligned with said dispensing port.

7. An integrated beverage blending system comprising:
   at least one system controller;
   an ice portioning module;
   an ingredient module;
   a dispensing apparatus in communication with said ice portioning module and/or said ingredient module;
   a blender module with an integrated cleaning apparatus, wherein said ice portioning module comprises: an ice bin for storing ice which incorporates one or more sloped walls to feed ice into a dispensing port, thereby allowing ice in said ice bin to be dispensed into said dispensing apparatus; and a sensor in communication with said controller which determines the amount of ice which is dispensed into said dispensing apparatus.

8. An integrated beverage blending system comprising:
at least one system controller;
an ice portioning module;
an ingredient module;
a dispensing apparatus in communication with said ice portioning module and/or said ingredient module;
a blender module with an integrated cleaning apparatus, wherein ice from said ice portioning module and at least one ingredient from said ingredient module are dispensed into a beverage container via said dispensing apparatus; and wherein said beverage container with said ice and said ingredient is placed in said blender module for blending and/or mixing said ice and said ingredient in said beverage container, thereby producing said beverage, wherein said blender module comprises: a housing; a door which provides access to the interior of said housing; a spindle and blade used to blend and/or mix said ice and ingredient to form said beverage; a container seal disposed about said spindle which is capable of sealing said beverage container during blending and/or mixing, as well as preventing said beverage container from rotating thereabout; and a container holder.

9. The system according to claim 8, further comprising a water and/or cleaning and/or sanitizing solution supply system connected to said container holder for cleaning and/or sanitizing at least said interior of said housing, said spindle, said blade and said container seal after completion of blending or mixing each beverage.

10. The system according to claim 8, wherein said cleaning mode is activated subsequent to the last mixing sequence and returning of said door to the closed position.

11. The system according to claim 8, wherein said blender module includes a variable speed and direction motor to move said spindle.

12. The system according to claim 8, wherein said blender module includes a variable speed motor to move said blade.

13. An integrated beverage blending system comprising:
at least one system controller;
an ice portioning module;
an ingredient module;
a dispensing apparatus in communication with said ice portioning module and/or said ingredient module;
a blender module with an integrated cleaning apparatus, wherein ice from said ice portioning module and at least one ingredient from said ingredient module are dispensed into a beverage container via said dispensing apparatus; and wherein said beverage container with said ice and said ingredient is placed in said blender module for blending and/or mixing said ice and said ingredient in said beverage container, thereby producing said beverage, wherein said beverage container is a single serving cup, wherein said blender module comprises: a housing; a door which provides access to the interior of said housing; a spindle and blade used to blend and/or mix said ice and ingredient to form said beverage; a container seal disposed about said spindle which is capable of sealing said single serving cup during blending and/or mixing, as well as preventing said single serving cup from rotating thereabout; and a container holder.

14. An integrated beverage blending system comprising:
at least one system controller;
an ice portioning module;
an ingredient module;
a dispensing apparatus in communication with said ice portioning module and/or said ingredient module;
a blender module with an integrated cleaning apparatus, wherein said dispensing apparatus is a dispensing nozzle comprising an ice dispensing conduit and a plurality of ingredient conduits disposed about said ice dispensing conduit, wherein each ingredient conduit is isolated from other ingredient conduits and said ice dispensing conduit, whereby ingredient contamination is avoided, wherein said ingredient conduits comprises a heat transfer device disposed about or proximate to said ingredient conduit, thereby controlling the temperature of said ingredient passing through said ingredient conduit.

15. A refrigerated beverage and blending system comprising:
a controller for system operation;
an ice portioning module utilizing a positive displacement method;
an ingredient module;
a dispensing apparatus in communication with said ice portion control module and said ingredient module, wherein said ice and said ingredient are dispensed into a beverage container via said dispensing apparatus; and
at least one blender module with integrated cleaning apparatus which blends and/or mixes said ice and said ingredient in said beverage container, thereby producing said beverage, wherein said ice portioning module comprises: an ice bin for storing ice; a rotatable base of said ice bin having a plurality of portion control compartments; at least one leveling blade that ensures consistent volume of said ice in each portion control compartment; a dispensing port in communication between a selected portion control compartment and said dispensing apparatus, thereby allowing ice in said selected portion control compartment to be dispensed into said dispensing apparatus; and a sensor in communication with said controller and which determines the amount of ice which is dispensed into said dispensing apparatus.

16. A refrigerated beverage and blending system comprising:
a controller for system operation;
an ice portioning module utilizing a positive displacement method;
an ingredient module;
a dispensing apparatus in communication with said ice portion control module and said ingredient module, wherein said ice and said ingredient are dispensed into a beverage container via said dispensing apparatus; and
at least one blender module with integrated cleaning apparatus which blends and/or mixes said ice and said ingredient in said beverage container, thereby producing said beverage, wherein said ice portion control module comprises: an ice bin for storing ice; an ice portion dispensing system which comprises a tipping beam where a counterbalance on one side is balanced when a equal weight of ice is dispensed on the other side causing said ice portion to tip into the dispensing apparatus.

17. The system according to claim 16, wherein the number of ice portion tips is used to provide the required portion as prescribed by the recipe; and further comprising at least one dispensing port in communication between a selected portion control compartment and said dispensing apparatus, thereby allowing ice in said compartment to be dispensed into said dispensing apparatus; and a sensor in communication with said controller and which determines the amount of ice which is dispensed into said dispensing apparatus.

18. A refrigerated beverage and blending system comprising:
- a controller for system operation;
- an ice portioning module utilizing a positive displacement method;
- an ingredient module;
- a dispensing apparatus in communication with said ice portion control module and said ingredient module, wherein said ice and said ingredient are dispensed into a beverage container via said dispensing apparatus; and
- at least one blender module with integrated cleaning apparatus which blends and/or mixes said ice and said ingredient in said beverage container, thereby producing said beverage, wherein said ice portioning module comprises: an ice bin for storing ice which incorporates at least one sloped wall to feed ice into a dispensing port in communication between a selected portion control compartment and said dispensing apparatus, thereby allowing ice in said selected portion control compartment to be dispensed into said dispensing apparatus; and a sensor in communication with said controller and which determines the amount of ice which is dispensed into said dispensing apparatus.

19. The system according to claim 18, wherein said portion control compartment is disposed within said dispensing port comprises a plurality of movable plates disposed above and below said dispensing port.

20. The system according to claim 19, wherein said dispensing port is of a predetermined volume.

21. The system according to claim 19, further comprising at least one sensor in communication with said controller in the dispensing port detect the presence of ice and cause said plates to move.

22. The system according to claim 21, wherein said controller in communication with the dispensing port determines the volume of ice dispensed.

* * * * *